United States Patent
Matsuoka et al.

(10) Patent No.: US 10,561,963 B2
(45) Date of Patent: Feb. 18, 2020

(54) LIQUID-LIQUID CONTACT DEVICE AND LIQUID-LIQUID CONTACT METHOD

(71) Applicant: Kobe Steel, Ltd., Hyogo (JP)

(72) Inventors: Akira Matsuoka, Kobe (JP); Koji Noishiki, Takasago (JP); Tomohiro Ozono, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/079,026

(22) PCT Filed: Feb. 3, 2017

(86) PCT No.: PCT/JP2017/003951
§ 371 (c)(1),
(2) Date: Aug. 22, 2018

(87) PCT Pub. No.: WO2017/145702
PCT Pub. Date: Aug. 31, 2017

(65) Prior Publication Data
US 2019/0046896 A1    Feb. 14, 2019

(30) Foreign Application Priority Data
Feb. 24, 2016    (JP) .................................. 2016-032984

(51) Int. Cl.
*B01D 11/04* (2006.01)
*B01D 11/00* (2006.01)

(52) U.S. Cl.
CPC .......... *B01D 11/04* (2013.01); *B01D 11/0484* (2013.01); *B01D 2011/002* (2013.01)

(58) Field of Classification Search
CPC ................ B01D 11/04; B01D 11/0484; B01D 2011/002; B01D 64/14; B01D 63/067;
(Continued)

(56) References Cited

U.S. PATENT DOCUMENTS

| 2,614,064 | A | * | 10/1952 | Carney | .............. | B01D 11/0419 |
|---|---|---|---|---|---|---|
| | | | | | | 196/14.52 |
| 3,718,319 | A | * | 2/1973 | Weisman | ................ | B01D 11/04 |
| | | | | | | 366/134 |
| 5,076,930 | A | * | 12/1991 | Rubin | ................ | B01D 11/0446 |
| | | | | | | 196/14.52 |

FOREIGN PATENT DOCUMENTS

| JP | 04313303 A | * 11/1992 | ............. B01D 11/04 |
| JP | H04-313303 A | 11/1992 | |

(Continued)

OTHER PUBLICATIONS

Notification of Transmittal of Translation of the International Preliminary Report on Patentability and Translation of Written Opinion of the International Searching Authority; PCT/JP2017/003951; dated Sep. 7, 2018.

*Primary Examiner* — Nam X Nguyen
*Assistant Examiner* — Ekandra S. Miller-Cruz
(74) *Attorney, Agent, or Firm* — Studebaker & Brackett PC

(57) ABSTRACT

A liquid-liquid contact device includes: an internal casing surrounding an inner chamber for providing countercurrent contact between a light liquid and a heavy liquid; an external casing surrounding the internal casing so as to form an outer chamber around the internal casing; a light liquid introduction tube guiding the light liquid to the inner chamber; and a heavy liquid introduction tube guiding the heavy liquid to the inner chamber. The internal casing has an upper opening and a lower opening which opens at a location below the upper opening. The external casing has a heavy liquid discharge outlet through which the heavy liquid is allowed to be discharged from the outer chamber, and a light liquid discharge outlet which is disposed above the heavy liquid discharge outlet and through which the light liquid is allowed to be discharged from the outer chamber.

8 Claims, 8 Drawing Sheets

(58) Field of Classification Search
CPC ......... B01D 2311/06; B01D 2311/2688; C02F 1/26; C02F 3/12; C02F 3/34; C12N 1/16; Y02W 10/15
USPC ........ 210/634, 208, 223; 196/14.52; 208/46, 208/177, 311, 339; 366/187, 273; 422/258
See application file for complete search history.

(56) References Cited

FOREIGN PATENT DOCUMENTS

| | | | |
|---|---|---|---|
| JP | 2016-123907 A | 7/2016 | |
| WO | WO-2014095280 A1 * | 6/2014 | ........... B01D 11/043 |

* cited by examiner

LIQUID-LIQUID CONTACT DEVICE AND LIQUID-LIQUID CONTACT METHOD

TECHNICAL FIELD

The present invention relates to a liquid-liquid contact device and a liquid-liquid contact method.

BACKGROUND ART

Conventionally, there is known a liquid-liquid contact device that provides countercurrent contact between a light liquid and a heavy liquid in order to generate interaction between the light liquid and the heavy liquid that has a larger specific gravity than the light liquid. The following Patent Literature 1 discloses an extraction device as one example of such a liquid-liquid contact device.

The extraction device disclosed in Patent Literature 1 provides countercurrent contact between a light-gravity liquid (light liquid) and a heavy-gravity liquid (heavy liquid) in order to generate extraction of a specific component from one of the light-gravity liquid and the heavy-gravity liquid to the other one as interaction. This extraction device of Patent Literature 1 has a double-tube structure having an outer tube extending in a vertical direction and an inner tube disposed in the outer tube to extend in the same direction as the outer tube. A space in an inside of the inner tube forms an inner chamber for providing countercurrent contact between the light-gravity liquid and the heavy-gravity liquid. An outer chamber is formed between an outer wall surface of the inner tube and an inner wall surface of the outer tube. A heavy-gravity liquid drawing-out hole that provides communication between the inner chamber and the outer chamber is formed at a lower part of the inner tube.

A light-gravity liquid supplying tube for supplying the light-gravity liquid to the inner chamber is disposed at a position that is in a lower part of the inner tube and that is above the heavy-gravity liquid drawing-out hole. A light-gravity liquid discharge tube that is in communication with the inner chamber so as to discharge the light-gravity liquid from the inner chamber is disposed at an upper part of the inner tube. A heavy-gravity liquid supplying tube for supplying the heavy-gravity liquid to the inner chamber is disposed at a position that is slightly above the light-gravity liquid discharge tube. A heavy-gravity liquid discharge tube that is in communication with the outer chamber so as to discharge the heavy-gravity liquid from the outer chamber is disposed at an upper part of the outer tube.

Further, the light-gravity liquid ejected from the light-gravity liquid supplying tube ascends in the inner chamber from below to above thereof while the heavy-gravity liquid ejected from the heavy-gravity liquid supplying tube descends in the inner chamber from above to below thereof, whereby the light-gravity liquid and the heavy-gravity liquid undergo countercurrent contact with each other in the inner chamber. This countercurrent contact allows a specific component to be extracted from one of the light-gravity liquid and the heavy-gravity liquid to the other one. The light-gravity liquid having made the countercurrent contact is discharged from an upper part of the inner chamber to an outside of the device through the light-gravity liquid discharge tube. Further, the heavy-gravity liquid having made the countercurrent contact flows out from a lower part of the inner chamber to the outer chamber through the heavy-gravity liquid drawing-out hole and ascends in the outer chamber to be discharged to the outside of the device through the heavy-gravity liquid discharge tube.

In the extraction device disclosed in Patent Literature 1, a phenomenon called flooding may occur in which, depending on conditions for supplying the light-gravity liquid and the heavy-gravity liquid into the inner chamber, the heavy-gravity liquid overflows out from an upper side of the inner chamber through the light-gravity liquid discharge tube, and the heavy-gravity liquid flows out to the outside of the device through the light-gravity liquid discharge tube that is originally designed to discharge the light-gravity liquid. For example, when a supply flow rate of the light-gravity liquid to the lower part of the inner chamber increases to be larger than a supply flow rate of the heavy-gravity liquid to the upper part of the inner chamber, the heavy-gravity liquid hardly descends from the upper part of the inner chamber due to a large amount of the light-gravity liquid that ascends from the lower part of the inner chamber and, as a result of this, the heavy-gravity liquid overflows to the outside of the device through the light-gravity liquid discharge tube connected to the upper part of the inner chamber. In such a case, the heavy-gravity liquid is discharged through the light-gravity liquid discharge tube originally designed in such a manner that only the light-gravity liquid is discharged in a state of being separated from the heavy-gravity liquid. This causes mingling of the light-gravity liquid and the heavy-gravity liquid with each other after processing in the extraction device, thereby necessitating a subsequent treatment of separating the light-gravity liquid and the heavy-gravity liquid from each other.

CITATION LIST

Patent Literature

Patent Literature 1: Japanese Unexamined Patent Publication No. H04-313303

SUMMARY OF INVENTION

An object of the present invention is to provide a liquid-liquid contact device and a liquid-liquid contact method that are capable of preventing a situation in which a light liquid and a heavy liquid, after processing, are discharged from the liquid-liquid contact device in a state of being mingled with each other even in a case in which the heavy liquid introduced into an inner chamber overflows from an upper side of the inner chamber.

A liquid-liquid contact device according to an aspect of the present invention is a liquid-liquid contact device which provides countercurrent contact between a light liquid and a heavy liquid which has a larger specific gravity than the light liquid, the liquid-liquid contact device including an internal casing extending in a vertical direction and surrounding an inner chamber for providing countercurrent contact between the light liquid ascending from below and the heavy liquid descending from above; an external casing surrounding the internal casing so as to form an outer chamber around the internal casing; a light liquid introduction tube guiding the light liquid from an outside of the external casing to the inner chamber; and a heavy liquid introduction tube guiding the heavy liquid from an outside of the external casing to the inner chamber, in which the light liquid introduction tube has a light liquid ejection orifice disposed in the inner chamber, the light liquid ejection orifice allowing the light liquid guided by the light liquid introduction tube to be ejected into the inner chamber through the light liquid ejection orifice; the heavy liquid introduction tube has a heavy liquid ejection orifice disposed in the inner chamber and above the light liquid ejection orifice, the heavy liquid ejection orifice allowing the heavy liquid guided by the heavy liquid introduction tube to be ejected into the inner chamber through the heavy liquid ejection orifice; the internal casing has an upper opening and a lower opening which opens at a location below the upper opening, the upper opening allowing the light liquid having made the countercurrent contact with the heavy liquid to flow out from the inner chamber to the outer chamber through the upper opening, the lower opening allowing the heavy liquid having made the countercurrent contact with the light liquid to flow out from the inner chamber to the outer chamber through the lower opening; the external casing has a heavy liquid discharge outlet and a light liquid discharge outlet which is disposed above the heavy liquid discharge outlet, the heavy liquid discharge outlet allowing the heavy liquid to be discharged from the outer chamber through the heavy liquid discharge outlet, the light liquid discharge outlet allowing the light liquid to be discharged from the outer chamber through the light liquid discharge outlet.

A liquid-liquid contact method according to another aspect of the present invention is a liquid-liquid contact method which provides countercurrent contact between a light liquid and a heavy liquid which has a larger specific gravity than the light liquid, the liquid-liquid contact method including a preparation step of preparing the liquid-liquid contact device; an introduction step of introducing the light liquid into the inner chamber through the light liquid introduction tube and introducing the heavy liquid into the inner chamber through the heavy liquid introduction tube; a contact step of providing countercurrent contact between the light liquid and the heavy liquid by allowing the light liquid introduced into the inner chamber to ascend and allowing the heavy liquid introduced into the inner chamber to descend; a discharge step performed after the contact step, the discharge step allowing the light liquid to flow out from the inner chamber to the outer chamber through the upper opening so as to be discharged from the outer chamber through the light liquid discharge outlet, and allowing the heavy liquid to flow out from the inner chamber to the outer chamber through the lower opening so as to be discharged from the outer chamber through the heavy liquid discharge outlet; and a discharge flow rate controlling step of controlling at least one of a discharge flow rate of the light liquid discharged from the outer chamber through the light liquid discharge outlet and a discharge flow rate of the heavy liquid discharged from the outer chamber through the heavy liquid discharge outlet so as to maintain a height position of a contact interface between the light liquid and the heavy liquid within a range of between the light liquid discharge outlet and the heavy liquid discharge outlet, the contact interface being formed in the outer chamber.

A liquid-liquid contact method according to still another aspect of the present invention is a liquid-liquid contact method which provides countercurrent contact between a light liquid and a heavy liquid which has a larger specific gravity than the light liquid, the liquid-liquid contact method including a preparation step of preparing the liquid-liquid contact device; an introduction step of introducing the light liquid into the inner chamber through the light liquid introduction tube and introducing the heavy liquid into the inner chamber through the heavy liquid introduction tube; a contact step of providing countercurrent contact between the light liquid and the heavy liquid by allowing the light liquid introduced into the inner chamber to ascend and allowing the heavy liquid introduced into the inner chamber to descend; a discharge step performed after the contact step, the discharge step allowing the light liquid to flow out from the inner chamber to the outer chamber through the upper opening so as to be discharged from the outer chamber through the light liquid discharge outlet, and allowing the heavy liquid to flow out from the inner chamber to the outer chamber through the lower opening so as to be discharged from the outer chamber through the heavy liquid discharge outlet; and an introduction flow rate controlling step of controlling at least one of an introduction flow rate of the light liquid introduced into the inner chamber through the light liquid introduction tube and an introduction flow rate of the heavy liquid introduced into the inner chamber through the heavy liquid introduction tube so as to maintain a height position of a contact interface between the light liquid and the heavy liquid within a range of between the light liquid discharge outlet and the heavy liquid discharge outlet, the contact interface being formed in the outer chamber.

DESCRIPTION OF EMBODIMENTS

Hereafter, embodiments of the present invention will be described with reference to the drawings.

Figure 1:
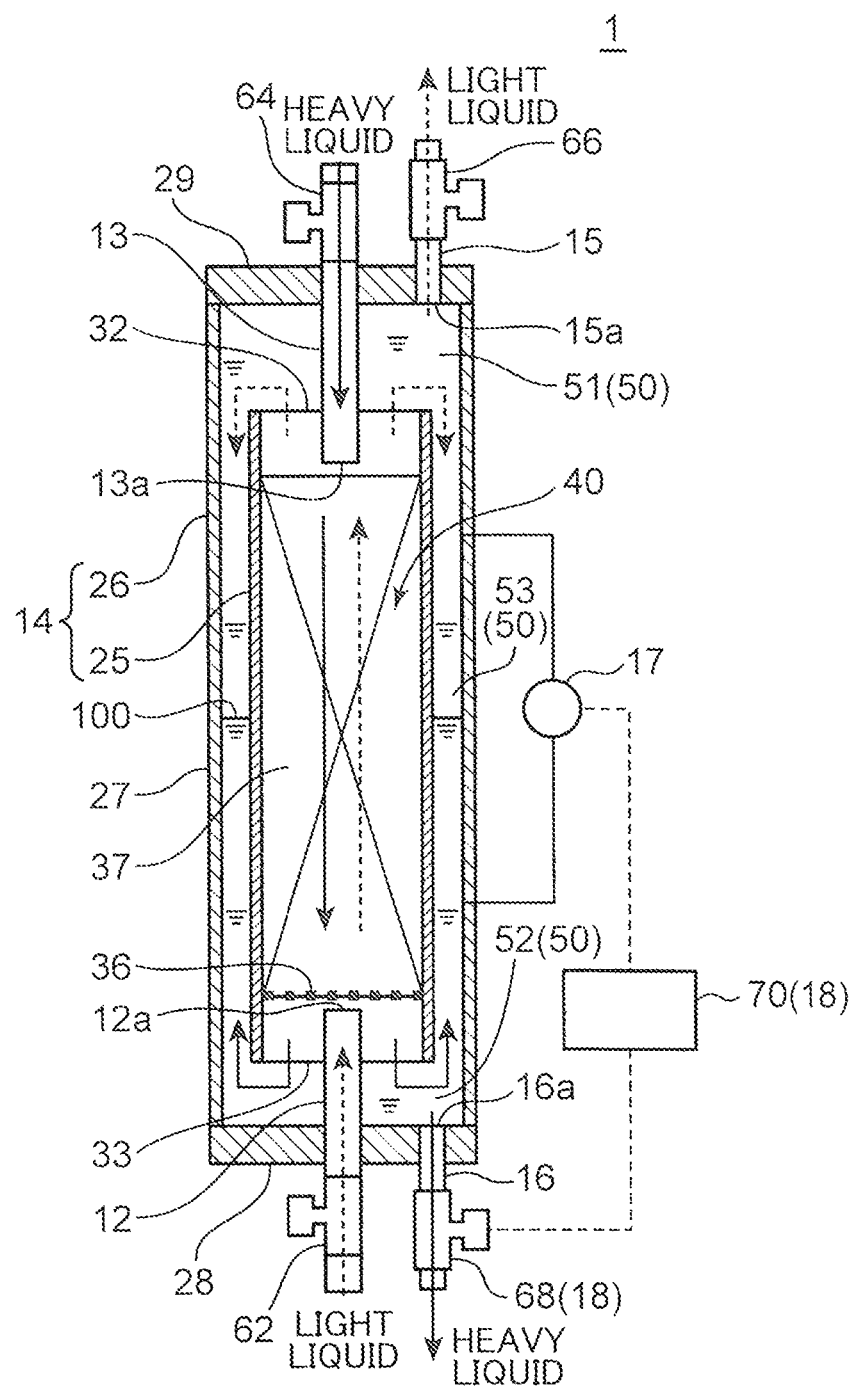
FIG. 1 is a schematic view of a liquid-liquid contact device according to an embodiment of the present invention.

FIG. 1 shows an overall configuration of a liquid-liquid contact device 1 according to an embodiment of the present invention. The liquid-liquid contact device 1 provides countercurrent contact between a light liquid and a heavy liquid that has a larger specific gravity than the light liquid in order to generate interaction between the light liquid and the heavy liquid. In the present embodiment, the liquid-liquid contact device 1 causes extraction of a specific component from one of the light liquid and the heavy liquid to the other one as interaction. In other words, the liquid-liquid contact device 1 according to the present embodiment is an extraction device. The liquid-liquid contact device 1 is configured to be capable of discharging the light liquid and the heavy liquid after the interaction (after the extraction treatment) individually in a state of being separated from each other.

The liquid-liquid contact device 1 includes a light liquid introduction tube 12, a heavy liquid introduction tube 13, a device main body 14, a liquid level gauge 17, a discharge flow rate controlling device 18, a light liquid introduction flow rate adjustment valve 62, a heavy liquid introduction flow rate adjustment valve 64, and a light liquid discharge flow rate adjustment valve 66.

The light liquid introduction tube 12 is a pipe for introducing the light liquid to a later-mentioned inner chamber 40 of the device main body 14. The heavy liquid introduction tube 13 is a pipe for introducing the heavy liquid to the later-mentioned inner chamber 40 of the device main body 14. Specific configurations of the light liquid introduction tube 12 and the heavy liquid introduction tube 13 will be described later.

The device main body 14 performs a treatment of providing countercurrent contact between the light liquid and the heavy liquid and a treatment of separating the light liquid and the heavy liquid from each other after processing and individually discharging the light liquid and the heavy liquid. The device main body 14 has an internal casing 25, an external casing 26, a perforated plate 36, and a filler 37.

The internal casing 25 surrounds the inner chamber 40 which is a space for providing countercurrent contact between the light liquid ascending from below and the heavy liquid descending from above. The internal casing 25 is a tubular body that extends in a vertical direction. The internal casing 25 has an upper opening 32 and a lower opening 33 that opens at a location below the upper opening 32. In other words, the internal casing 25 is open at an upper end and at a lower end thereof, so that the opening at the upper end of the internal casing 25 is the upper opening 32, and the opening at the lower end of the internal casing 25 is the lower opening 33. As will be described later, the light liquid is introduced into the inner chamber 40 from the lower side, and the heavy liquid is introduced into the inner chamber 40 from the upper side. The introduced light liquid ascends in the inner chamber 40, while the introduced heavy liquid descends in the inner chamber 40, whereby the light liquid and the heavy liquid undergo countercurrent contact with each other in the inner chamber 40. Further, the light liquid having made the countercurrent contact flows out from the upper opening 32, and the heavy liquid having made the countercurrent contact flows out from the lower opening 33. In other words, the upper opening 32 allows the light liquid having made the countercurrent contact with the heavy liquid to flow out from the inner chamber 40 through the upper opening 32, and the lower opening 33 allows the heavy liquid having made the countercurrent contact with the light liquid to flow out from the inner chamber 40 through the lower opening 33.

The external casing 26 surrounds the internal casing 25 to form an outer chamber 50 around the internal casing 25. The external casing 26 has a casing main body 27, a lower lid 28, an upper lid 29, a light liquid discharge tube 15, and a heavy liquid discharge tube 16.

The casing main body 27 has a tubular shape extending in a vertical direction. The casing main body 27 has a diameter larger than the internal casing 25 and has a length larger than the internal casing 25. The casing main body 27 is disposed coaxially with the internal casing 25 so as to surround the internal casing 25. This forms a double-tube structure. An upper end and a lower end of the casing main body 27 are open. The lower lid 28 is attached to the lower end of the casing main body 27 so as to cover and seal the opening at the lower end of the casing main body 27. The upper lid 29 is attached to the upper end of the casing main body 27 so as to cover and seal the opening at the upper end of the casing main body 27.

The outer chamber 50 formed in an inside of the external casing 26 and on an outside of the internal casing 25 is in communication with the inner chamber 40 by the upper opening 32 and the lower opening 33 of the internal casing 25. The outer chamber 50 is a space where the light liquid flowed out from the inner chamber 40 through the upper opening 32 of the internal casing 25 and the heavy liquid flowed out from the inner chamber 40 through the lower opening 33 of the internal casing 25 temporarily stay. In the outer chamber 50, the light liquid and the heavy liquid stay in a state of being separated from each other in the vertical direction by the difference in specific gravity between the two. The outer chamber 50 includes an upper space 51, a lower space 52, and a gap region 53.

The upper space 51 corresponds to a region that is a part of the outer chamber 50 and that is located above the upper end of the internal casing 25, that is, a region that is a part of the outer chamber 50 and that is located above the upper opening 32 of the internal casing 25. The lower space 52 corresponds to a region that is a part of the outer chamber 50 and that is located below the lower end of the internal casing 25, that is, a region that is a part of the outer chamber 50 and that is located below the lower opening 33 of the internal casing 25. The gap region 53 corresponds to a region that is a part of the outer chamber 50 and that is located between an outer peripheral surface of the internal casing 25 and an inner peripheral surface of the external casing 26. The light liquid stays in the upper space 51 and in an approximately upper half of the gap region 53, whereas the heavy liquid stays in the lower space 52 and in an approximately lower half of the gap region 53. Therefore, a contact interface 100 of the light liquid and the heavy liquid that stay in the outer chamber 50 is formed in the gap region 53.

The perforated plate 36 is a plate body in which numerous through-holes are formed. The perforated plate 36 is disposed generally horizontally at a lower part of the inner chamber 40 and fixed to the internal casing 25.

The filler 37 fills the inside of the inner chamber 40 on the perforated plate 36. The filler 37 functions to improve the efficiency of contact between the light liquid and the heavy liquid that are brought into countercurrent contact in the inner chamber 40.

The light liquid introduction tube 12 is inserted into a lower part of the inner chamber 40 within the internal casing 25 through the lower opening 33. The light liquid introduction tube 12 is inserted into the lower part of the inner chamber 40 by penetrating through the lower lid 28 from the lower side of the external casing 26. The light liquid introduction tube 12 functions to guide the light liquid from the outside of the external casing 26 into the inner chamber 40. A tip end (upper end) of the light liquid introduction tube 12 is disposed at a position that is located in a lower part of the inner chamber 40 and that is below the perforated plate 36 and above the lower opening 33. The light liquid introduction tube 12 has a light liquid ejection orifice 12a disposed at the tip end (upper end) of the light liquid introduction tube 12. The light liquid ejection orifice 12a is disposed at a position that is in the inner chamber 40 and that is below the perforated plate 36 and above the lower opening 33. The light liquid ejection orifice 12a allows the light liquid guided by the light liquid introduction tube 12 to be ejected into the inner chamber 40 through the light liquid ejection orifice 12a. Accordingly, the light liquid is ejected from the light liquid ejection orifice 12a at a position above the lower opening 33 in the inner chamber 40.

The heavy liquid introduction tube 13 is inserted into an upper part of the inner chamber 40 within the internal casing 25 through the upper opening 32. The heavy liquid introduction tube 13 is inserted into the upper part of the inner chamber 40 by penetrating through the upper lid 29 from the upper side of the external casing 26. The heavy liquid introduction tube 13 functions to guide the heavy liquid from the outside of the external casing 26 into the inner chamber 40. A tip end (lower end) of the heavy liquid introduction tube 13 is disposed at a position that is located in an upper part of the inner chamber 40 and that is above a region filled with the filler 37 and below the upper opening 32. The heavy liquid introduction tube 13 has a heavy liquid ejection orifice 13a disposed at the tip end (lower end) of the heavy liquid introduction tube 13. The heavy liquid ejection orifice 13a is disposed at a position that is in the inner chamber 40 and that is above the region filled with the filler 37 and below the upper opening 32. In other words, the heavy liquid ejection orifice 13a is disposed in the inner chamber 40 and above the light liquid ejection orifice 12a. The heavy liquid ejection orifice 13a allows the heavy liquid guided by the heavy liquid introduction tube 13 to be ejected into the inner chamber 40 through the heavy liquid ejection orifice 13a. Accordingly, the heavy liquid is ejected from the heavy liquid ejection orifice 13a at a position below the upper opening 32 in the inner chamber 40. Also, the heavy liquid is ejected from the heavy liquid ejection orifice 13a at a position above the light liquid ejection orifice 12a in the inner chamber 40.

The light liquid discharge tube 15 is a pipe for discharging the light liquid from the outer chamber 50. The light liquid discharge tube 15 is attached to the upper lid 29 so as to penetrate through the upper lid 29. The light liquid discharge tube 15 has a light liquid discharge outlet 15a disposed at a lower end thereof. The light liquid discharge outlet 15a is a discharge outlet of the external casing 26 for discharging the light liquid and allows the light liquid to be discharged from the outer chamber 50 through the light liquid discharge outlet 15a. The light liquid discharge outlet 15a is disposed above a later-mentioned heavy liquid discharge outlet 16a. The light liquid discharge outlet 15a is disposed at a position above the upper opening 32 of the internal casing 25, that is, at a position above the upper end of the internal casing 25. Specifically, the light liquid discharge outlet 15a is disposed at an upper end part of the outer chamber 50, that is, at an upper end part of the upper space 51, and is disposed to be spaced apart upward from the upper opening 32 of the internal casing 25. The light liquid is discharged from the upper space 51 of the outer chamber 50 through the light liquid discharge outlet 15a to flow into the light liquid discharge tube 15 and is discharged to the outside of the liquid-liquid contact device 1 by passing through the light liquid discharge tube 15.

The heavy liquid discharge tube 16 is a pipe for discharging the heavy liquid from the outer chamber 50. The heavy liquid discharge tube 16 is attached to the lower lid 28 so as to penetrate through the lower lid 28. The heavy liquid discharge tube 16 has a heavy liquid discharge outlet 16a disposed at an upper end thereof. The heavy liquid discharge outlet 16a is a discharge outlet of the external casing 26 for discharging the heavy liquid and allows the heavy liquid to be discharged from the outer chamber 50 through the heavy liquid discharge outlet 16a. The heavy liquid discharge outlet 16a is disposed at a position below the lower opening 33 of the internal casing 25, that is, at a position below the lower end of the internal casing 25. Specifically, the heavy liquid discharge outlet 16a is disposed at a lower end part of the outer chamber 50, that is, at a lower end part of the lower space 52, and is disposed to be spaced apart downward from the lower opening 33 of the internal casing 25. The heavy liquid is discharged from the lower space 52 of the outer chamber 50 through the heavy liquid discharge outlet 16a to flow into the heavy liquid discharge tube 16 and is discharged to the outside of the liquid-liquid contact device 1 by passing through the heavy liquid discharge tube 16.

The liquid level gauge 17 detects a height position of the contact interface 100 between the light liquid and the heavy liquid in the outer chamber 50. Specifically, the liquid level gauge 17 detects the height position of the contact interface 100 that is present between the light liquid and the heavy liquid and that is formed in the gap region 53. The liquid level gauge 17 sequentially outputs the data of the detected height position of the contact interface 100 to a later-mentioned controlling unit 70 of the discharge flow rate controlling device 18.

In the present embodiment, the discharge flow rate controlling device 18 controls a discharge flow rate of the heavy liquid discharged from the outer chamber 50 through the heavy liquid discharge tube 16. The discharge flow rate controlling device 18 controls the discharge flow rate of the heavy liquid discharged from the lower space 52 of the outer chamber 50 through the heavy liquid discharge tube 16 so that the height position of the contact interface 100 formed in the outer chamber 50 between the light liquid and the heavy liquid is maintained within a range of between the light liquid discharge outlet 15a and the heavy liquid discharge outlet 16a. Specifically, the discharge flow rate controlling device 18 controls the discharge flow rate of the heavy liquid discharged from the lower space 52 of the outer chamber 50 through the heavy liquid discharge tube 16 so that the height position of the contact interface 100 is maintained within a range of between the upper opening 32 and the lower opening 33 of the internal casing 25. In further detail, the discharge flow rate controlling device 18 controls the discharge flow rate of the heavy liquid discharged through the heavy liquid discharge tube 16 so that the height position of the contact interface 100 is maintained in a neighborhood of a center position, as viewed in the vertical direction, of the internal casing 25. The discharge flow rate controlling device 18 has a heavy liquid discharge flow rate adjustment valve 68 and the controlling unit 70.

The heavy liquid discharge flow rate adjustment valve 68 functions to adjust the flow rate of the heavy liquid discharged from the outer chamber 50. The heavy liquid discharge flow rate adjustment valve 68 is disposed in the heavy liquid discharge tube 16 and adjusts the flow rate of the heavy liquid flowing through the heavy liquid discharge tube 16. The heavy liquid discharge flow rate adjustment valve 68 increases or decreases the discharge flow rate of the heavy liquid in accordance with a controlling signal that is input from the controlling unit 70.

The controlling unit 70 causes the heavy liquid discharge flow rate adjustment valve 68 to adjust the discharge flow rate of the heavy liquid in accordance with the data of the height position of the contact interface 100 between the light liquid and the heavy liquid that is detected by the liquid level gauge 17 so that the height position of the contact interface 100 is maintained within a range of between the light liquid discharge outlet 15a and the heavy liquid discharge outlet 16a.

Specifically, the controlling unit 70 stores a predetermined set height position between the light liquid discharge outlet 15a and the heavy liquid discharge outlet 16a as a set value of the height position of the contact interface 100. The set height position is a height position that is exactly in the middle between the upper opening 32 and the lower opening 33 of the internal casing 25, and corresponds to a central height position, as viewed in the vertical direction, of the internal casing 25. When the height position of the contact interface 100 that is indicated by the data received from the liquid level gauge 17 is higher than the set height position, the controlling unit 70 sends to the heavy liquid discharge flow rate adjustment valve 68 a controlling signal that gives an instruction to increase the discharge flow rate of the heavy liquid, thereby causing the heavy liquid discharge flow rate adjustment valve 68 to increase the discharge flow rate of the heavy liquid discharged from the lower space 52 of the outer chamber 50 through the heavy liquid discharge tube 16. This process lowers the contact interface 100 towards the set height position.

On the other hand, when the height position of the contact interface 100 that is indicated by the data received from the liquid level gauge 17 is lower than the set height position, the controlling unit 70 sends to the heavy liquid discharge flow rate adjustment valve 68 a controlling signal that gives an instruction to decrease the discharge flow rate of the heavy liquid, thereby causing the heavy liquid discharge flow rate adjustment valve 68 to decrease the discharge flow rate of the heavy liquid discharged from the lower space 52 of the outer chamber 50 through the heavy liquid discharge tube 16. This process raises the contact interface 100 towards the set height position.

The controlling unit 70 causes the heavy liquid discharge flow rate adjustment valve 68 to adjust the discharge flow rate of the heavy liquid in the above-described manner, whereby the height position of the contact interface 100 formed in the outer chamber 50 between the light liquid and the heavy liquid is maintained around the set height position.

The light liquid introduction flow rate adjustment valve 62 is disposed in the light liquid introduction tube 12. The light liquid introduction flow rate adjustment valve 62 functions to adjust the flow rate of the light liquid introduced into the inner chamber 40 through the light liquid introduction tube 12.

The heavy liquid introduction flow rate adjustment valve 64 is disposed in the heavy liquid introduction tube 13. The heavy liquid introduction flow rate adjustment valve 64 functions to adjust the flow rate of the heavy liquid introduced into the inner chamber 40 through the heavy liquid introduction tube 13.

The light liquid discharge flow rate adjustment valve 66 is disposed in the light liquid discharge tube 15. The light liquid discharge flow rate adjustment valve 66 functions to adjust the discharge flow rate of the light liquid discharged from the upper space 51 of the outer chamber 50 through the light liquid discharge tube 15.

Next, a liquid-liquid contact method according to the present embodiment will be described. In the present embodiment, description will be given on a liquid-liquid contact method in which a specific component is extracted as interaction between a light liquid and a heavy liquid by allowing the light liquid and the heavy liquid to undergo countercurrent contact.

First, a liquid-liquid contact device 1 having the aforementioned configuration is prepared. Further, in the liquid-liquid contact device 1, a light liquid is introduced into the inner chamber 40 through the light liquid introduction tube 12, and a heavy liquid is introduced into the inner chamber 40 through the heavy liquid introduction tube 13. A specific component serving as an object of extraction is contained in one of the light liquid and the heavy liquid that are introduced into the inner chamber 40. The other one of the light liquid and the heavy liquid is an extracting agent capable of extracting the specific component from the aforementioned one liquid.

The light liquid is ejected from the light liquid ejection orifice 12a at a position below the perforated plate 36 in the inner chamber 40 and ascends in the inner chamber 40 by passing through numerous holes formed in the perforated plate 36. On the other hand, the heavy liquid is ejected from the heavy liquid ejection orifice 13a at a position above the filler 37 in the inner chamber 40 and descends in the inner chamber 40. This provides countercurrent contact between the light liquid and the heavy liquid in the inner chamber 40, particularly in the region filled with the filler 37. By this countercurrent contact, the specific component is extracted from one of the light liquid and the heavy liquid to the other one. Further, the light liquid having made the countercurrent contact ascends and flows out into the outer chamber 50 from the upper opening 32, while the heavy liquid having made the countercurrent contact descends to pass through the numerous holes of the perforated plate 36 and flows out into the outer chamber 50 from the lower opening 33.

The light liquid flowed out into the outer chamber 50 temporarily stays in the upper space 51 and in the upper half of the gap region 53 of the outer chamber 50 and is discharged from the light liquid discharge outlet 15a by passing through the inside of the light liquid discharge tube 15. Also, the heavy liquid flowed out into the outer chamber 50 temporarily stays in the lower space 52 and in the lower half of the gap region 53 of the outer chamber 50 and is discharged from the heavy liquid discharge outlet 16a by passing through the inside of the heavy liquid discharge tube 16.

The light liquid and the heavy liquid that temporarily stay in the outer chamber 50 form a contact interface 100 between the light liquid and the heavy liquid in the gap region 53. The liquid level gauge 17 detects the height position of the contact interface 100 and outputs the data of the detected height position to the controlling unit 70 of the discharge flow rate controlling device 18.

In accordance with the data of the height position of the contact interface 100 detected by the liquid level gauge 17, the discharge flow rate controlling device 18 controls the discharge flow rate of the heavy liquid discharged from the outer chamber 50 through the heavy liquid discharge outlet 16a (heavy liquid discharge tube 16) so that the height position of the contact interface 100 formed in the gap region 53 of the outer chamber 50 between the light liquid and the heavy liquid is maintained within a range of between the light liquid discharge outlet 15a and the heavy liquid discharge outlet 16a.

Specifically, the controlling unit 70 compares the stored set height position of the contact interface with the height position of the contact interface 100 indicated by the data received from the liquid level gauge 17. Further, when the height position of the contact interface 100 indicated by the data received from the liquid level gauge 17 is higher than the set height position, the controlling unit 70 sends to the heavy liquid discharge flow rate adjustment valve 68 a controlling signal that gives an instruction to increase the discharge flow rate of the heavy liquid. On the other hand, when the height position of the contact interface 100 indicated by the data received from the liquid level gauge 17 is lower than the set height position, the controlling unit 70 sends to the heavy liquid discharge flow rate adjustment valve 68 a controlling signal that gives an instruction to decrease the discharge flow rate of the heavy liquid.

When the controlling signal received from the controlling unit 70 is an instruction to increase the discharge flow rate of the heavy liquid, the heavy liquid discharge flow rate adjustment valve 68 increases the discharge flow rate of the heavy liquid discharged from the outer chamber 50 through the heavy liquid discharge tube 16. On the other hand, when the controlling signal received from the controlling unit 70 is an instruction to decrease the discharge flow rate of the heavy liquid, the heavy liquid discharge flow rate adjustment valve 68 decreases the discharge flow rate of the heavy liquid discharged from the outer chamber 50 through the heavy liquid discharge tube 16. By such adjustment of the discharge flow rate of the heavy liquid by the heavy liquid discharge flow rate adjustment valve 68 in accordance with the controlling signal from the controlling unit 70, the height position of the contact interface 100 between the light liquid and the heavy liquid in the outer chamber 50 is maintained around the height position located exactly in the middle between the light liquid discharge outlet 15a and the heavy liquid discharge outlet 16a, that is, in further detail, around the height position located exactly in the middle between the upper opening 32 and the lower opening 33 of the internal casing 25.

In the manner described above, the extraction method using the liquid-liquid contact device 1 according to the present embodiment is carried out.

In the present embodiment, the light liquid discharge outlet 15a that discharges the light liquid from the outer chamber 50 is disposed above the heavy liquid discharge outlet 16a that discharges the heavy liquid from the outer chamber 50. For this reason, supposing that the heavy liquid introduced into the inner chamber 40 overflows from the upper opening 32 to the outer chamber 50, the heavy liquid overflowed is not discharged through the light liquid discharge outlet 15a but is discharged through the heavy liquid discharge outlet 16a that is positioned below the light liquid discharge outlet 15a.

Specifically, the light liquid flowed out into the outer chamber 50 through the upper opening 32 is present in the outer chamber 50 at ordinary times and, when the heavy liquid overflows from upper opening 32 into the outer chamber 50 as described above, the heavy liquid is mixedly present in the light liquid within the outer chamber 50. At this time, a larger downward force is applied to the heavy liquid due to gravity than to the light liquid, so that the heavy liquid overflowed into the outer chamber 50 descends faster, whereas the light liquid does not descend like the heavy liquid. For this reason, the heavy liquid descending faster is not discharged from the light liquid discharge outlet 15a which is the upper one of the light liquid discharge outlet 15a and the heavy liquid discharge outlet 16a, and the light liquid is discharged from the light liquid discharge outlet 15a. On the other hand, the light liquid that does not descend like the heavy liquid is not discharged from the heavy liquid discharge outlet 16a which is the lower one of the light liquid discharge outlet 15a and the heavy liquid discharge outlet 16a, and the heavy liquid is discharged from the heavy liquid discharge outlet 16a. Therefore, in the present embodiment, even when the heavy liquid introduced into the inner chamber 40 overflows from the upper opening 32 of the inner chamber 40 into the outer chamber 50, it is possible to prevent the heavy liquid from being discharged through the light liquid discharge outlet 15a that is originally designed to discharge only the light liquid. As a result of this, it is possible to prevent a situation in which the light liquid and the heavy liquid having processed are discharged from the light liquid discharge outlet 15a by being mingled with each other. Also, in the present embodiment, even when the light liquid introduced into the inner chamber 40 overflows from the lower opening 33 of the inner chamber 40 into the outer chamber 50, it is possible to prevent the light liquid from being discharged through the heavy liquid discharge outlet 16a that is originally designed to discharge only the heavy liquid. As a result of this, it is possible to prevent a situation in which the heavy liquid and the light liquid having processed are discharged from the heavy liquid discharge outlet 16a by being mingled with each other.

Also, in the present embodiment, the light liquid discharge outlet 15a is disposed above the upper opening 32 of the internal casing 25. For this reason, even when the heavy liquid overflows from the inner chamber 40 into the outer chamber 50 through the upper opening 32, the heavy liquid can be prevented from being discharged through the light liquid discharge outlet 15a with more certainty.

Also, in the present embodiment, the heavy liquid discharge outlet 16a is disposed below the lower opening 33 of the internal casing 25. For this reason, even when the light liquid overflows from the inner chamber 40 into the outer chamber 50 through the lower opening 33, the light liquid can be prevented from being discharged through the heavy liquid discharge outlet 16a with more certainty.

Also, in the present embodiment, the heavy liquid is ejected from the heavy liquid ejection orifice 13a at a position located below the upper opening 32 in the inner chamber 40. For this reason, the heavy liquid ejected from the heavy liquid ejection orifice 13a can be introduced into the inner chamber 40 with certainty.

Also, in the present embodiment, the light liquid is ejected from the light liquid ejection orifice 12a at a position located above the lower opening 33 in the inner chamber 40. For this reason, the light liquid ejected from the light liquid ejection orifice 12a can be introduced into the inner chamber 40 with certainty.

Also, in the present embodiment, the discharge flow rate controlling device 18 controls the discharge flow rate of the heavy liquid discharged from the outer chamber 50 through the heavy liquid discharge tube 16 so that the height position of the contact interface 100 between the light liquid and the heavy liquid in the outer chamber 50 is maintained within a range of between the light liquid discharge outlet 15a and the heavy liquid discharge outlet 16a. For this reason, the contact interface 100 can be prevented from rising to reach the light liquid discharge outlet 15a when the introduction flow rate of the heavy liquid into the inner chamber 40 increases, and also the contact interface 100 can be prevented from lowering to reach the heavy liquid discharge outlet 16a when the introduction flow rate of the light liquid into the inner chamber 40 increases. Therefore, it is possible to prevent a situation in which the heavy liquid is discharged from the outer chamber 50 through the light liquid discharge outlet 15a or the light liquid is discharged from the outer chamber 50 through the heavy liquid discharge outlet 16a in accordance with a fluctuation in the introduction flow rates of the heavy liquid and the light liquid into the inner chamber 40.

Next, description will be given on a result of an experiment as to whether the countercurrent contact between the light liquid and the heavy liquid in the inner chamber 40 is actually carried out, by the liquid-liquid contact method using the liquid-liquid contact device 1. Also, description will be given on a result of an experiment as to whether the mingling of the heavy liquid into the light liquid discharged from the light liquid discharge tube 15 and the mingling of the light liquid into the heavy liquid discharged from the heavy liquid discharge tube 16 occur, in the state in which the contact interface 100 of the light liquid and the heavy liquid flowed out from the inner chamber 40 into the outer chamber 50 after the countercurrent contact is formed at a height position between the light liquid discharge outlet 15a and the heavy liquid discharge outlet 16a.

Figure 2:
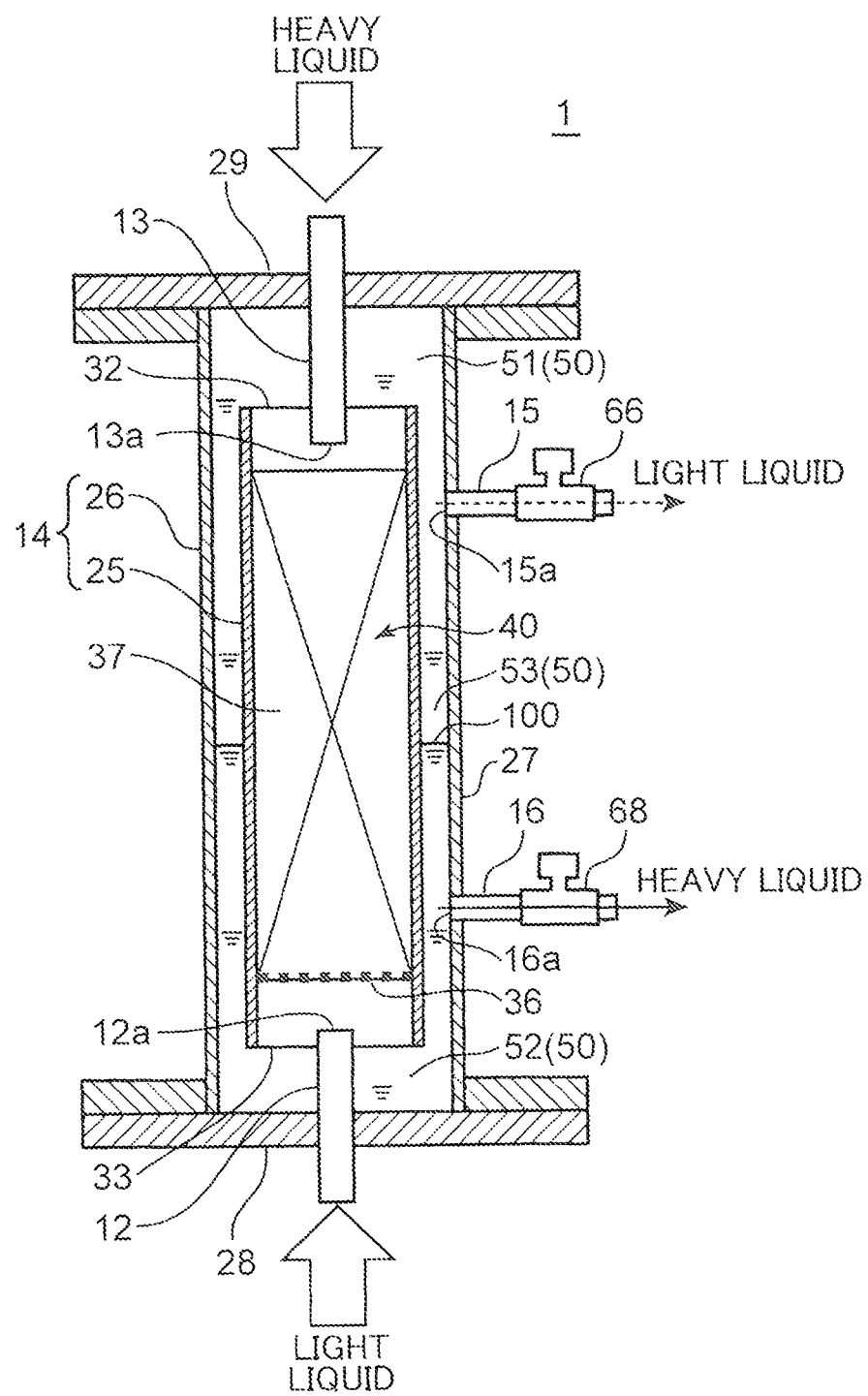
FIG. 2 is a schematic view of a liquid-liquid contact device used in an experiment for examining effects obtained by a liquid-liquid contact method according to the present invention.
Figure 3:
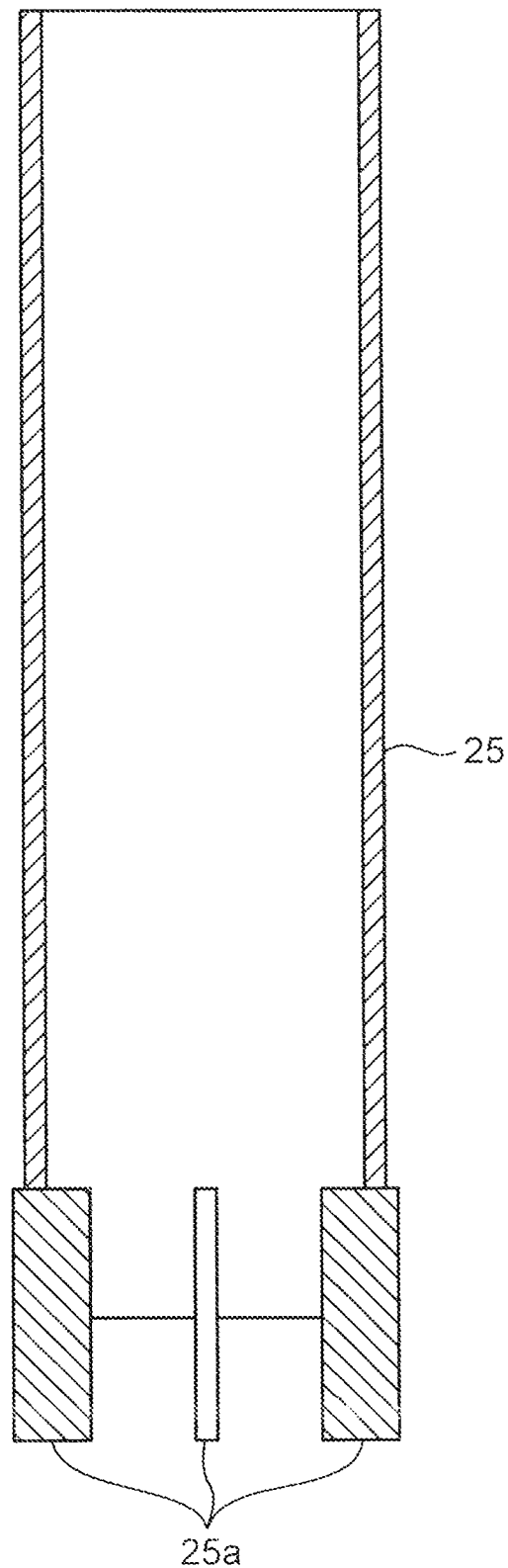
FIG. 3 is a longitudinal cross-sectional view of an internal casing of the liquid-liquid contact device used in the experiment.

In this experiment, a liquid-liquid contact device 1 such as shown in FIG. 2 was used. A basic configuration that the liquid-liquid contact device 1 used in this experiment has is similar to that of the liquid-liquid contact device 1 described above. However, in the liquid-liquid contact device 1 used in this experiment, the light liquid discharge tube 15 and the heavy liquid discharge tube 16 are attached to the casing main body 27. Specifically, the light liquid discharge tube 15 is attached to a site of the casing main body 27 below the upper opening 32 located at the upper end of the internal casing 25 and above the center position, as viewed in the vertical direction, of the casing main body 27. The heavy liquid discharge tube 16 is attached to a site of the casing main body 27 above the lower opening 33 located at the lower end of the internal casing 25 and below the center position, as viewed in the vertical direction, of the casing main body 27. This allows the light liquid discharge outlet 15a to be positioned below the upper opening 32 and above the center position, as viewed in the vertical direction, of the casing main body 27, and allows the heavy liquid discharge outlet 16a to be positioned above the lower opening 33 and below the center position, as viewed in the vertical direction, of the casing main body 27. The light liquid discharge tube 15 and the heavy liquid discharge tube 16 extend horizontally outward in a radial direction of the casing main body 27 from the respective attachment sites to the casing main body 27.

Further, the liquid-liquid contact device 1 used in this experiment is not provided with the light liquid introduction flow rate adjustment valve and the heavy liquid introduction flow rate adjustment valve, and also is not provided with the controlling unit that controls the heavy liquid discharge flow rate adjustment valve 68 for adjusting the discharge flow rate of the heavy liquid.

Further, in the liquid-liquid contact device 1 used in this experiment, a pipe made of vinyl chloride and having an inner diameter of 103 mm, an outer diameter of 114 mm, and a vertical length of 800 mm is used as the casing main body 27. Also, a pipe made of vinyl chloride and having an inner diameter of 71 mm, an outer diameter of 76 mm, and a vertical length of 600 mm is used as the internal casing 25.

Figure 4:
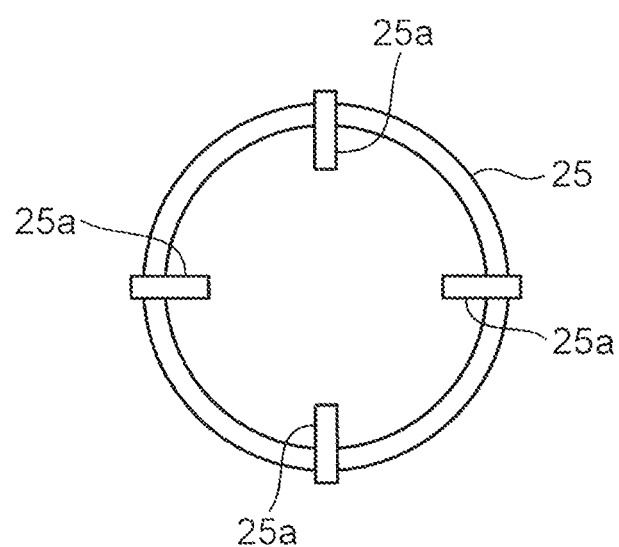
FIG. 4 is a view of the internal casing of the liquid-liquid contact device used in the experiment, as viewed from below.

Four legs 25a such as shown in FIG. 4 were disposed at the lower end part of the internal casing 25, and the internal casing 25 was let to stand on the lower lid 28 by means of these four legs 25a and disposed in the outer chamber 50. Each of the legs 25a is made of a plate-shaped small piece having a vertical length of 200 mm, a thickness of 5 mm, and a width of 15 mm as viewed in the radial direction of the internal casing 25. The four legs 25a are disposed at an equal interval in a circumferential direction of the internal casing 25. Also, each of the legs 25a protrudes downward by 100 mm from the lower end of the internal casing 25 and is attached to the internal casing 25 in a state of protruding radially inward by 10 mm from an inner wall surface of the internal casing 25.

Also, a disk-shaped plate which was formed of polyether ether ketone (PEEK) or polyvinyl chloride (PVC) and in which numerous through-holes having a diameter of 10 mm were disposed in a zigzag pattern was used as the perforated plate 36 disposed at the lower part of the inner chamber 40.

Also, the space in the inner chamber 40 and above the perforated plate 36 was filled with numerous Raschig rings made of ceramics as the filler 37. Each of the Raschig rings has a cylindrical shape with the length in a central axis direction and the outer diameter being both 12 mm and with the thickness being 2 mm.

Also, although not illustrated, a level sensor having a probe was used as an interface meter for detecting the height position of the contact interface 100 between the light liquid and the heavy liquid in the outer chamber 50. The probe is a detecting unit for detecting the position of the contact interface 100 and has a length extending over a distance approximately from the upper lid 29 to a neighborhood of the lower end of the internal casing 25. This probe was caused to penetrate through the upper lid 29 in an orientation extending in the vertical direction and inserted into the gap region 53 of the outer chamber 50 down to a position near the lower end of the internal casing 25. In this state, the level sensor was fixed to the external casing 26.

With use of the liquid-liquid contact device 1 as described above, a heavy liquid was introduced into the inner chamber 40 through the heavy liquid introduction tube 13 at a flow rate of 30 L/h, and a light liquid was introduced into the inner chamber 40 through the light liquid introduction tube 12 at a flow rate of 30 L/h. Water containing metal ions was used as the heavy liquid. Also, a liquid obtained by diluting PC-88A, which was a metal extracting agent manufactured by Daihachi Chemical Industry Co., Ltd., with kerosene to 1 mol/L was used as the light liquid. The metal extracting agent PC-88A contains 2-ethylhexyl phosphonic acid mono-2-ethylhexyl ester as a major component.

As a result of introducing the heavy liquid and the light liquid into the inner chamber 40 as described above, it was found that the heavy liquid descended in the inner chamber 40 from an upper part thereof, while the light liquid ascended in the inner chamber 40 from a lower part thereof, and that the light liquid and the heavy liquid underwent countercurrent contact with each other in the inner chamber 40. Also, it was found that the light liquid flowed out from the inner chamber 40 into the outer chamber 50 through the upper opening 32 after being subjected to the countercurrent contact and the heavy liquid flowed out from the inner chamber 40 into the outer chamber 50 through the lower opening 33 after being subjected to the countercurrent contact formed a contact interface 100 thereof at a height position between the light liquid discharge outlet 15a and the heavy liquid discharge outlet 16a in the gap region 53 of the outer chamber 50. Further, it was found that only the light liquid was discharged through the light liquid discharge tube 15, and the heavy liquid was not mingled in the discharged light liquid, whereas only the heavy liquid was discharged through the heavy liquid discharge tube 16, and the light liquid was not mingled in the discharged heavy liquid.

The liquid-liquid contact device according to the present invention is not limited to the one as described in the aforementioned embodiment. The following configuration, for example, can be adopted as the configuration of the liquid-liquid contact device according to the present invention.

Figure 5:
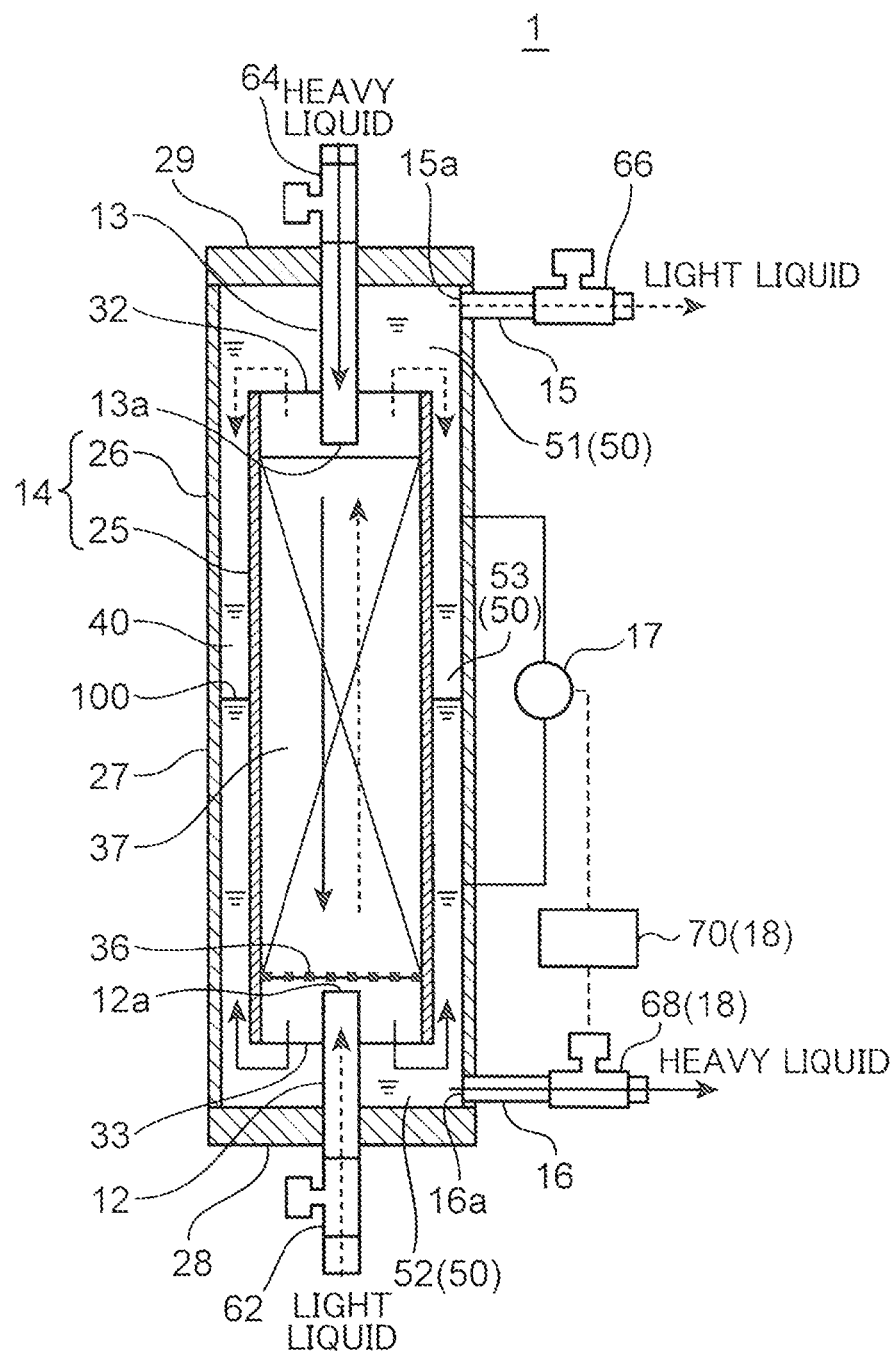
FIG. 5 is a schematic view of a liquid-liquid contact device according to a first modification of the embodiment of the present invention.

The light liquid discharge tube 15 need not be necessarily attached to the upper lid 29 of the external casing 26, and the heavy liquid discharge tube 16 need not be necessarily attached to the lower lid 28 of the external casing 26. In other words, the light liquid discharge tube 15 and the heavy liquid discharge tube 16 may be attached to the casing main body 27 as shown in the liquid-liquid contact device 1 used in the aforementioned experiment. However, the attachment sites of the light liquid discharge tube 15 and the heavy liquid discharge tube 16 to the casing main body 27 are not limited to the site where the light liquid discharge tube 15 and the heavy liquid discharge tube 16 were attached to the casing main body 27 in the liquid-liquid contact device 1 used in the aforementioned experiment. FIG. 5 shows a liquid-liquid contact device 1 according to a first modification in which an attachment site different from that of the liquid-liquid contact device 1 used in the aforementioned experiment is adopted as the attachment sites of the light liquid discharge tube 15 and the heavy liquid discharge tube 16 to the casing main body 27.

In this liquid-liquid contact device 1 according to the first modification, the light liquid discharge tube 15 is attached to a site that is a part of the casing main body 27 and that is positioned above the upper opening 32 located at the upper end of the internal casing 25, whereas the heavy liquid discharge tube 16 is attached to a site that is a part of the casing main body 27 and that is positioned below the lower opening 33 located at the lower end of the internal casing 25. Specifically, the light liquid discharge tube 15 is attached to a side wall at an upper end part of the casing main body 27, and the heavy liquid discharge tube 16 is attached to a side wall at a lower end part of the casing main body 27.

The light liquid discharge tube 15 extends horizontally outward in the radial direction of the casing main body 27 from the attachment site to the casing main body 27. The heavy liquid discharge tube 16 extends horizontally outward in the radial direction of the casing main body 27 from the attachment site to the casing main body 27. The light liquid discharge outlet 15a is positioned above the upper opening 32 that is located at the upper end of the internal casing 25. The heavy liquid discharge outlet 16a is positioned below the lower opening 33 that is located at the lower end of the internal casing 25.

The configurations of the liquid-liquid contact device 1 according to the first modification other than those described above are similar to the configurations of the liquid-liquid contact device 1 according to the aforementioned embodiment.

Figure 6:
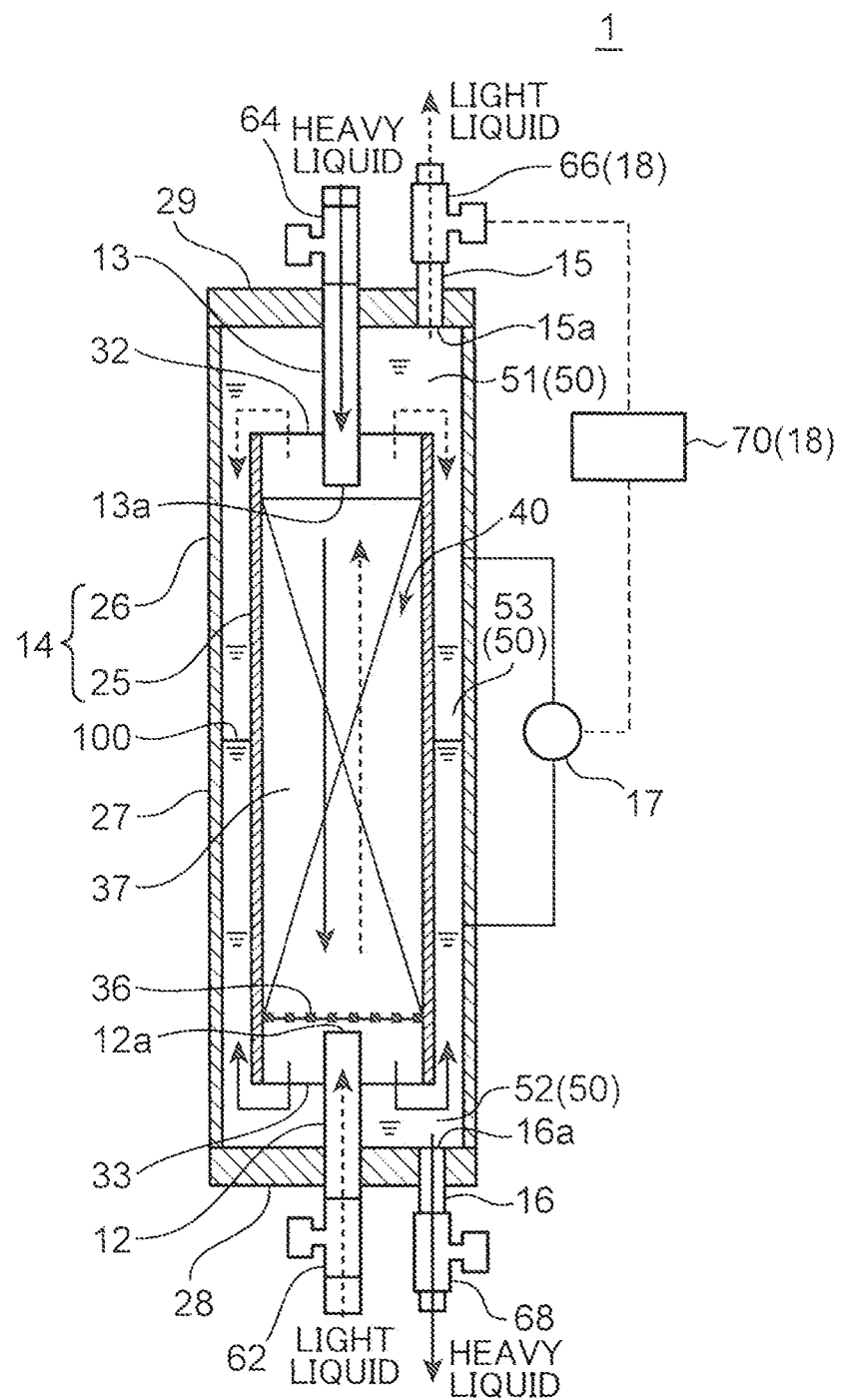
FIG. 6 is a schematic view of a liquid-liquid contact device according to a second modification of the embodiment of the present invention.

Alternatively, the discharge flow rate controlling device 18 may control the discharge flow rate of the light liquid discharged from the outer chamber 50 through the light liquid discharge outlet 15a so that the height position of the contact interface 100 formed in the outer chamber 50 between the light liquid and the heavy liquid is maintained within a range of between the light liquid discharge outlet 15a and the heavy liquid discharge outlet 16a. FIG. 6 shows a liquid-liquid contact device 1 according to a second modification in which the discharge flow rate controlling device 18 is provided.

In this liquid-liquid contact device 1 according to the second modification, the discharge flow rate controlling device 18 includes a light liquid discharge flow rate adjustment valve 66 and a controlling unit 70.

The light liquid discharge flow rate adjustment valve 66 is disposed in the light liquid discharge tube 15. The light liquid discharge flow rate adjustment valve 66 adjusts the discharge flow rate of the light liquid discharged from the upper space 51 of the outer chamber 50 through the light liquid discharge tube 15, that is, the discharge flow rate of the light liquid discharged from the upper space 51 of the outer chamber 50 through the light liquid discharge outlet 15a, in accordance with a controlling signal sent from the controlling unit 70.

The controlling unit 70 causes the light liquid discharge flow rate adjustment valve 66 to adjust the discharge flow rate of the light liquid discharged from the upper space 51 of the outer chamber 50 in accordance with the data of the height position of the contact interface 100 between the light liquid and the heavy liquid that is detected by the liquid level gauge 17 so that the height position of the contact interface 100 is maintained within a range of between the light liquid discharge outlet 15a and the heavy liquid discharge outlet 16a.

Specifically, as in the case of the aforementioned embodiment, the controlling unit 70 stores a set height position of the contact interface 100. When the height position of the contact interface 100 that is indicated by the data received from the liquid level gauge 17 is higher than the set height position, the controlling unit 70 sends to the light liquid discharge flow rate adjustment valve 66 a controlling signal that gives an instruction to decrease the discharge flow rate of the light liquid, thereby causing the light liquid discharge flow rate adjustment valve 66 to decrease the discharge flow rate of the light liquid discharged from the upper space 51 of the outer chamber 50. This process lowers the contact interface 100 towards the set height position.

On the other hand, when the height position of the contact interface 100 that is indicated by the data received from the liquid level gauge 17 is lower than the set height position, the controlling unit 70 sends to the light liquid discharge flow rate adjustment valve 66 a controlling signal that gives an instruction to increase the discharge flow rate of the light liquid, thereby causing the light liquid discharge flow rate adjustment valve 66 to increase the discharge flow rate of the light liquid discharged from the upper space 51 of the outer chamber 50. This process raises the contact interface 100 towards the set height position.

The controlling unit 70 causes the light liquid discharge flow rate adjustment valve 66 to adjust the discharge flow rate of the light liquid as described above, whereby the height position of the contact interface 100 formed in the outer chamber 50 is maintained around the set height position between the light liquid discharge outlet 15a and the heavy liquid discharge outlet 16a, specifically, around a height position that is exactly in the middle between the upper opening 32 and the lower opening 33 of the internal casing 25.

The configurations of the liquid-liquid contact device 1 according to the second modification other than those described above are similar to the configurations of the liquid-liquid contact device 1 according to the aforementioned embodiment.

Figure 7:
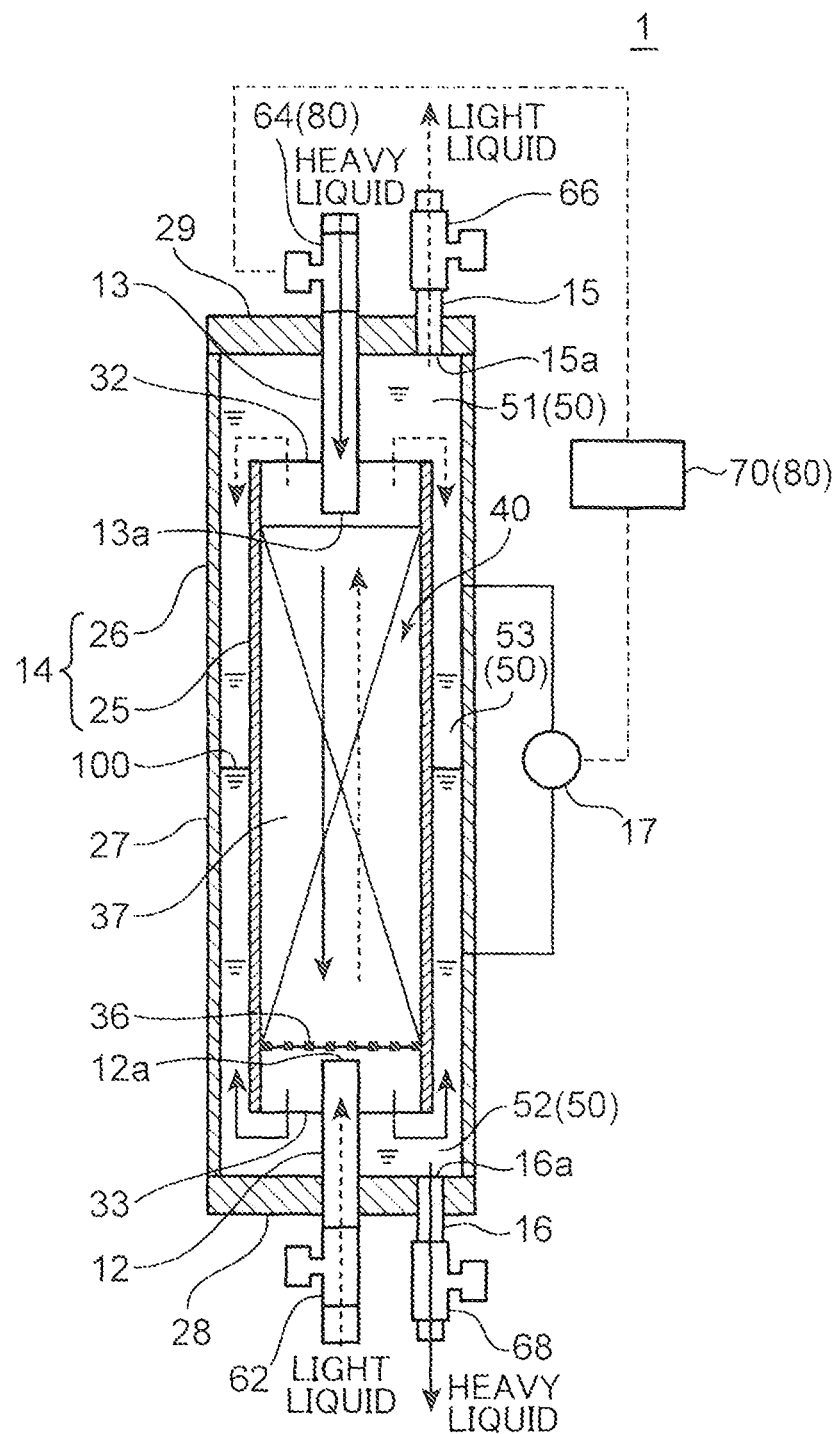
FIG. 7 is a schematic view of a liquid-liquid contact device according to a third modification of the embodiment of the present invention.

Alternatively, instead of the discharge flow rate controlling device 18, the liquid-liquid contact device 1 may be provided with an introduction flow rate controlling device 80 that controls the introduction flow rate of the heavy liquid introduced into the inner chamber 40 through the heavy liquid introduction tube 13 as means for maintaining the height position of the contact interface 100 formed in the outer chamber 50 between the light liquid and the heavy liquid to be within a range of between the light liquid discharge outlet 15a and the heavy liquid discharge outlet 16a. FIG. 7 shows a liquid-liquid contact device 1 according to a third modification in which the introduction flow rate controlling device 80 is provided.

In the liquid-liquid contact device 1 according to the third modification, the introduction flow rate controlling device 80 controls the introduction flow rate of the heavy liquid introduced into the inner chamber 40 through the heavy liquid introduction tube 13 so that the height position of the contact interface 100 formed in the outer chamber 50 between the light liquid and the heavy liquid is maintained within a range of between the light liquid discharge outlet 15a and the heavy liquid discharge outlet 16a. The introduction flow rate controlling device 80 directly controls the flow rate of the heavy liquid passing through the heavy liquid introduction tube 13, that is, an ejection flow rate of the heavy liquid ejected from the heavy liquid ejection orifice 13a. The introduction flow rate controlling device 80 includes a heavy liquid introduction flow rate adjustment valve 64 and a controlling unit 70.

The heavy liquid introduction flow rate adjustment valve 64 is disposed in the heavy liquid introduction tube 13 and adjusts the introduction flow rate of the heavy liquid introduced into the inner chamber 40 through the heavy liquid introduction tube 13 (that is, the ejection flow rate of the heavy liquid ejected from the heavy liquid ejection orifice 13a) in accordance with a controlling signal sent from the controlling unit 70.

The controlling unit 70 causes the heavy liquid introduction flow rate adjustment valve 64 to adjust the introduction flow rate of the heavy liquid introduced into the inner chamber 40 (that is, the ejection flow rate of the heavy liquid ejected from the heavy liquid ejection orifice 13a) in accordance with the data of the height position of the contact interface 100 between the light liquid and the heavy liquid that is detected by the liquid level gauge 17 so that the height position of the contact interface 100 is maintained within a range of between the light liquid discharge outlet 15a and the heavy liquid discharge outlet 16a.

Specifically, as in the case of the aforementioned embodiment, the controlling unit 70 stores a set height position of the contact interface 100. When the height position of the contact interface 100 that is indicated by the data received from the liquid level gauge 17 is higher than the set height position, the controlling unit 70 sends to the heavy liquid introduction flow rate adjustment valve 64 a controlling signal that gives an instruction to decrease the introduction flow rate of the heavy liquid, thereby causing the heavy liquid introduction flow rate adjustment valve 64 to decrease the introduction flow rate of the heavy liquid introduced into the inner chamber 40. This process decreases the flow rate of the heavy liquid flowing out from the inner chamber 40 into the outer chamber 50 through the lower opening 33, thereby lowering the contact interface 100 towards the set height position.

On the other hand, when the height position of the contact interface 100 that is indicated by the data received from the liquid level gauge 17 is lower than the set height position, the controlling unit 70 sends to the heavy liquid introduction flow rate adjustment valve 64 a controlling signal that gives an instruction to increase the introduction flow rate of the heavy liquid, thereby causing the heavy liquid introduction flow rate adjustment valve 64 to increase the introduction flow rate of the heavy liquid introduced into the inner chamber 40. This process increases the flow rate of the heavy liquid flowing out from the inner chamber 40 into the outer chamber 50 through the lower opening 33, thereby raising the contact interface 100 towards the set height position.

The controlling unit 70 causes the heavy liquid introduction flow rate adjustment valve 64 to adjust the introduction flow rate of the heavy liquid as described above, whereby the height position of the contact interface 100 formed in the outer chamber 50 is maintained around the set height position between the light liquid discharge outlet 15a and the heavy liquid discharge outlet 16a, specifically, around a height position that is exactly in the middle between the upper opening 32 and the lower opening 33 of the internal casing 25.

The configurations of the liquid-liquid contact device 1 according to the third modification other than those described above are similar to the configurations of the liquid-liquid contact device 1 according to the aforementioned embodiment.

Figure 8:
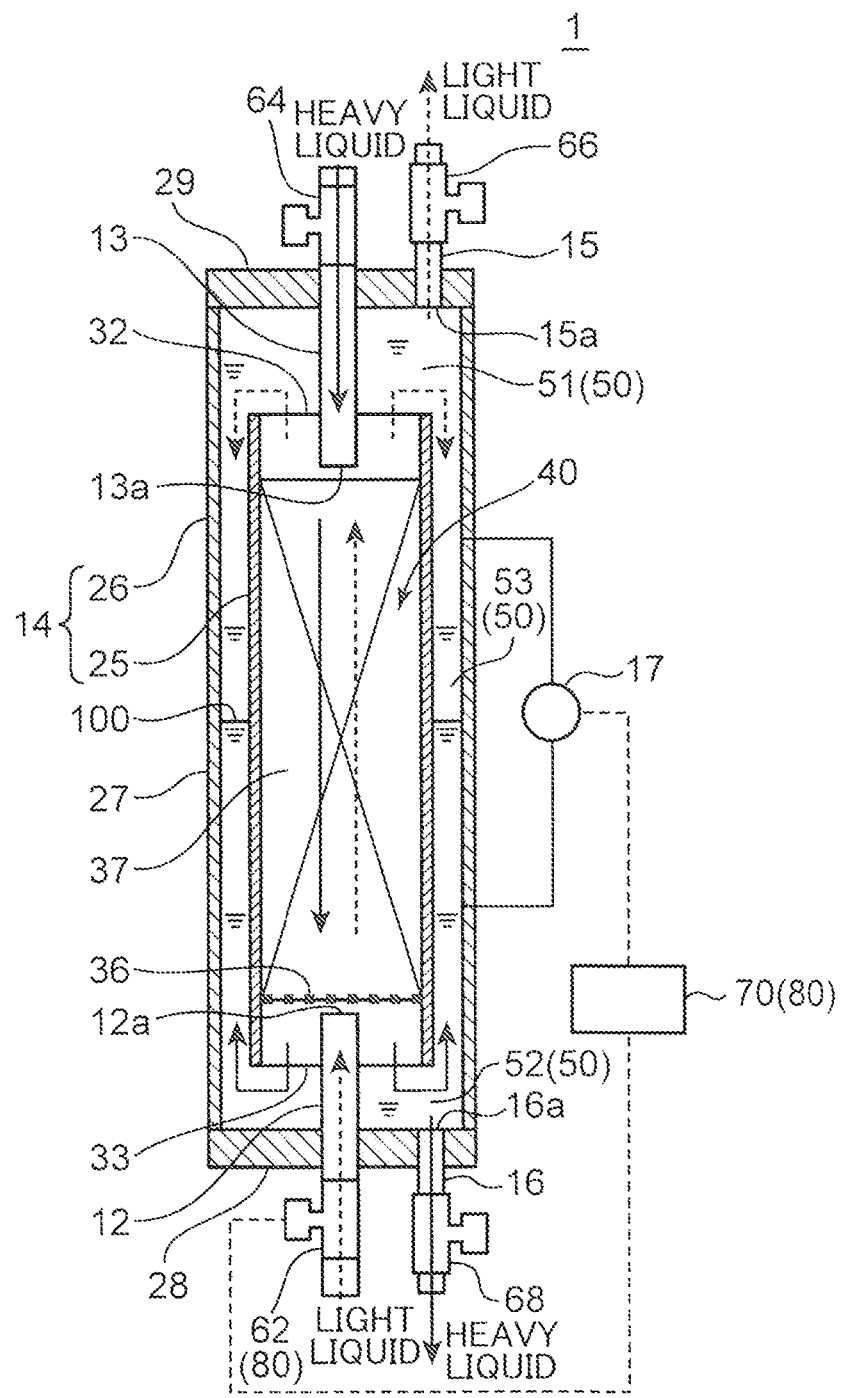
FIG. 8 is a schematic view of a liquid-liquid contact device according to a fourth modification of the embodiment of the present invention.

Alternatively, the introduction flow rate controlling device 80 may control the introduction flow rate of the light liquid introduced into the inner chamber 40 through the light liquid introduction tube 12 so that the height position of the contact interface 100 formed in the outer chamber 50 between the light liquid and the heavy liquid is maintained within a range of between the light liquid discharge outlet 15a and the heavy liquid discharge outlet 16a. FIG. 8 shows a liquid-liquid contact device 1 according to a fourth modification in which the introduction flow rate controlling device 80 is provided.

In this liquid-liquid contact device 1 according to the fourth modification, the introduction flow rate controlling device 80 directly controls the flow rate of the light liquid passing through the light liquid introduction tube 12, that is, the ejection flow rate of the light liquid ejected from the light liquid ejection orifice 12a. The introduction flow rate controlling device 80 in the fourth modification includes a light liquid introduction flow rate adjustment valve 62 and a controlling unit 70.

The light liquid introduction flow rate adjustment valve 62 is disposed in the light liquid introduction tube 12 and adjusts the introduction flow rate of the light liquid introduced into the inner chamber 40 through the light liquid introduction tube 12 (that is, the ejection flow rate of the light liquid ejected from the light liquid ejection orifice 12a) in accordance with a controlling signal sent from the controlling unit 70.

The controlling unit 70 causes the light liquid introduction flow rate adjustment valve 62 to adjust the introduction flow rate of the light liquid introduced into the inner chamber 40 (that is, the ejection flow rate of the light liquid ejected from the light liquid ejection orifice 12a) in accordance with the data of the height position of the contact interface 100 between the light liquid and the heavy liquid that is detected by the liquid level gauge 17 so that the height position of the contact interface 100 is maintained within a range of between the light liquid discharge outlet 15a and the heavy liquid discharge outlet 16a.

Specifically, as in the case of the aforementioned embodiment, the controlling unit 70 stores a set height position of the contact interface 100. When the height position of the contact interface 100 that is indicated by the data received from the liquid level gauge 17 is higher than the set height position, the controlling unit 70 sends to the light liquid introduction flow rate adjustment valve 62 a controlling signal that gives an instruction to increase the introduction flow rate of the light liquid, thereby causing the light liquid introduction flow rate adjustment valve 62 to increase the introduction flow rate of the light liquid introduced into the inner chamber 40. This process increases the flow rate of the light liquid flowing out from the inner chamber 40 into the outer chamber 50 through the upper opening 32, thereby lowering the contact interface 100 towards the set height position.

On the other hand, when the height position of the contact interface 100 that is indicated by the data received from the liquid level gauge 17 is lower than the set height position, the controlling unit 70 sends to the light liquid introduction flow rate adjustment valve 62 a controlling signal that gives an instruction to decrease the introduction flow rate of the light liquid, thereby causing the light liquid introduction flow rate adjustment valve 62 to decrease the introduction flow rate of the light liquid introduced into the inner chamber 40. This process decreases the flow rate of the light liquid flowing out from the inner chamber 40 into the outer chamber 50 through the upper opening 32, thereby raising the contact interface 100 towards the set height position.

The controlling unit 70 causes the light liquid introduction flow rate adjustment valve 62 to adjust the introduction flow rate of the light liquid as described above, whereby the height position of the contact interface 100 formed in the outer chamber 50 is maintained around the set height position between the light liquid discharge outlet 15a and the heavy liquid discharge outlet 16a, specifically, around a height position that is exactly in the middle between the upper opening 32 and the lower opening 33 of the internal casing 25.

The configurations of the liquid-liquid contact device 1 according to the fourth modification other than those described above are similar to the configurations of the liquid-liquid contact device 1 according to the aforementioned embodiment.

Alternatively, the liquid-liquid contact device according to the present invention need not be necessarily provided with a discharge flow rate controlling device or an introduction flow rate controlling device.

Further, adjustment of the discharge flow rate of the heavy liquid by the heavy liquid discharge flow rate adjustment valve 68, adjustment of the discharge flow rate of the light liquid by the light liquid discharge flow rate adjustment valve 66, adjustment of the introduction flow rate of the heavy liquid by the heavy liquid introduction flow rate adjustment valve 64, and adjustment of the introduction flow rate of the light liquid by the light liquid introduction flow rate adjustment valve 62 for maintaining the height position of the contact interface 100 formed in the outer chamber 50 between the light liquid and the heavy liquid to be within a range of between the light liquid discharge outlet 15a and the heavy liquid discharge outlet 16a, are not necessarily made in such a manner that the controlling unit 70 causes the respective adjustment valves to perform the adjustment by automatically controlling the respective adjustment valves in accordance with the data of the height position of the contact interface 100 that is detected by the liquid level gauge 17. For example, the respective adjustment valves may be manually controlled to perform adjustment of the discharge flow rate of the heavy liquid from the outer chamber 50, adjustment of the discharge flow rate of the light liquid from the outer chamber 50, adjustment of the introduction flow rate of the heavy liquid into the inner chamber 40, and adjustment of the introduction flow rate of the light liquid into the inner chamber 40, thereby maintaining the height position of the contact interface 100 formed in the outer chamber 50 to be within a range of between the light liquid discharge outlet 15a and the heavy liquid discharge outlet 16a.

Further, the discharge flow rate of the heavy liquid from the outer chamber may be controlled without the use of a heavy liquid discharge flow rate adjustment valve, and the discharge flow rate of the light liquid from the outer chamber may be controlled without the use of a light liquid discharge flow rate adjustment valve. Also, the introduction flow rate of the heavy liquid into the inner chamber may be controlled without the use of a heavy liquid introduction flow rate adjustment valve, and the introduction flow rate of the light liquid into the inner chamber may be controlled without the use of a light liquid introduction flow rate adjustment valve.

Also, the discharge flow rate controlling device 18 may control both of the discharge flow rate of the light liquid and the discharge flow rate of the heavy liquid from the outer chamber 50 so as to maintain the height position of the contact interface 100 to be within a range of between the light liquid discharge outlet 15a and the heavy liquid discharge outlet 16a. In this case, the controlling unit 70, for example, may send a controlling signal to the light liquid discharge flow rate adjustment valve 66 so as to cause the light liquid discharge flow rate adjustment valve 66 to adjust the discharge flow rate of the light liquid and may send a controlling signal to the heavy liquid discharge flow rate adjustment valve 68 so as to cause the heavy liquid discharge flow rate adjustment valve 68 to adjust the discharge flow rate of the heavy liquid.

Also, the introduction flow rate controlling device 80 may control both of the introduction flow rate of the light liquid and the introduction flow rate of the heavy liquid into the inner chamber 40 so as to maintain the height position of the contact interface 100 to be within a range of between the light liquid discharge outlet 15a and the heavy liquid discharge outlet 16a. In this case, the controlling unit 70, for example, may send a controlling signal to the light liquid introduction flow rate adjustment valve 62 so as to cause the light liquid introduction flow rate adjustment valve 62 to adjust the introduction flow rate of the light liquid into the inner chamber 40 and may send a controlling signal to the heavy liquid introduction flow rate adjustment valve 64 so as to cause the heavy liquid introduction flow rate adjustment valve 64 to adjust the introduction flow rate of the heavy liquid into the inner chamber 40.

Also, the internal casing need not necessarily be a tubular body, and the casing main body of the external casing need not necessarily be a tubular body.

Further, the upper opening need not necessarily be disposed at an upper end of the internal casing, and the lower opening need not necessarily be disposed at a lower end of the internal casing. In other words, as long as the lower opening is disposed below the upper opening, the upper opening may be disposed at a site other than the upper end of the internal casing, and the lower opening may be disposed at a site other than the lower end of the internal casing.

Also, the light liquid discharge outlet need not necessarily be one that is disposed in the light liquid discharge tube. For example, the light liquid discharge outlet may be formed in the upper lid or the casing main body of the external casing.

Also, the heavy liquid discharge outlet need not necessarily be one that is disposed in the heavy liquid discharge tube. For example, the heavy liquid discharge outlet may be formed in the lower lid or the casing main body of the external casing.

Also, in the configuration in which the light liquid discharge outlet is disposed above the upper opening of the internal casing, the heavy liquid discharge outlet may be disposed above the lower opening of the internal casing.

Also, in the configuration in which the heavy liquid discharge outlet is disposed below the lower opening of the internal casing, the light liquid discharge outlet may be disposed below the upper opening of the internal casing.

Further, in the present invention, the interaction generated between the light liquid and the heavy liquid by providing countercurrent contact between the light liquid and the heavy liquid is not limited to extraction alone. For example, the interaction generated between the light liquid and the heavy liquid by providing countercurrent contact between the light liquid and the heavy liquid may be a chemical reaction between the light liquid and the heavy liquid.

Also, the light liquid introduction tube is not necessarily limited to one that introduces the light liquid to a position located in the inner chamber and above the lower opening of the internal casing. For example, the light liquid introduction tube may be configured to introduce the light liquid to a position located outside the inner chamber and below the lower opening (position immediately below). In other words, the light liquid ejection orifice may be disposed at a position below the lower opening of the internal casing (position immediately below). With this configuration, the light liquid ejected from the light liquid ejection orifice ascends to flow into the inner chamber through the lower opening.

Also, the heavy liquid introduction tube is not necessarily limited to one that introduces the heavy liquid to a position located in the inner chamber and below the upper opening of the internal casing. For example, the heavy liquid introduction tube may be configured to introduce the heavy liquid to a position located outside the inner chamber and above the upper opening (position immediately above). In other words, the heavy liquid ejection orifice may be disposed at a position above the upper opening of the internal casing (position immediately above). With this configuration, the heavy liquid ejected from the heavy liquid ejection orifice descends to flow into the inner chamber through the upper opening.

(Summary of Embodiments and Modifications)

The embodiments and modifications described above are summarized as follows.

A liquid-liquid contact device according to the embodiments and modifications described above is a liquid-liquid contact device which provides countercurrent contact between a light liquid and a heavy liquid which has a larger specific gravity than the light liquid, the liquid-liquid contact device including: an internal casing extending in a vertical direction and surrounding an inner chamber for providing countercurrent contact between the light liquid ascending from below and the heavy liquid descending from above; an external casing surrounding the internal casing so as to form an outer chamber around the internal casing; a light liquid introduction tube guiding the light liquid from an outside of the external casing to the inner chamber; and a heavy liquid introduction tube guiding the heavy liquid from an outside of the external casing to the inner chamber, in which the light liquid introduction tube has a light liquid ejection orifice disposed in the inner chamber, the light liquid ejection orifice allowing the light liquid guided by the light liquid introduction tube to be ejected into the inner chamber through the light liquid ejection orifice; the heavy liquid introduction tube has a heavy liquid ejection orifice disposed in the inner chamber and above the light liquid ejection orifice, the heavy liquid ejection orifice allowing the heavy liquid guided by the heavy liquid introduction tube to be ejected into the inner chamber through the heavy liquid ejection orifice; the internal casing has an upper opening and a lower opening which opens at a location below the upper opening, the upper opening allowing the light liquid having made the countercurrent contact with the heavy liquid to flow out from the inner chamber to the outer chamber through the upper opening, the lower opening allowing the heavy liquid having made the countercurrent contact with the light liquid to flow out from the inner chamber to the outer chamber through the lower opening; the external casing has a heavy liquid discharge outlet and a light liquid discharge outlet which is disposed above the heavy liquid discharge outlet, the heavy liquid discharge outlet allowing the heavy liquid to be discharged from the outer chamber through the heavy liquid discharge outlet, the light liquid discharge outlet allowing the light liquid to be discharged from the outer chamber through the light liquid discharge outlet.

In this liquid-liquid contact device, the light liquid discharge outlet of the external casing which discharges the light liquid from the outer chamber is disposed above the heavy liquid discharge outlet of the external casing which discharges the heavy liquid from the outer chamber. For this reason, when the heavy liquid introduced into the inner chamber overflows from the upper opening to the outer chamber, the heavy liquid overflowed is not discharged through the light liquid discharge outlet but is discharged through the heavy liquid discharge outlet which is positioned below the light liquid discharge outlet. Specifically, the light liquid flowed out into the outer chamber through the upper opening is present in the outer chamber at ordinary times and, when the heavy liquid overflows from upper opening into the outer chamber as described above, the heavy liquid is mixedly present in the light liquid within the outer chamber. At this time, a larger downward force is applied to the heavy liquid due to gravity than to the light liquid, so that the heavy liquid overflowed into the outer chamber descends faster, whereas the light liquid does not descend like the heavy liquid. For this reason, the heavy liquid descending faster is not discharged from the light liquid discharge outlet which is the upper one of the light liquid discharge outlet and the heavy liquid discharge outlet, and the light liquid is discharged from the light liquid discharge outlet. On the other hand, the light liquid which does not descend like the heavy liquid is not discharged from the heavy liquid discharge outlet which is the lower one of the light liquid discharge outlet and the heavy liquid discharge outlet, and the heavy liquid is discharged from the heavy liquid discharge outlet. Therefore, in this liquid-liquid contact device, even when the heavy liquid introduced into the inner chamber overflows from the upper opening of the inner chamber into the outer chamber, it is possible to prevent the heavy liquid from being discharged through the light liquid discharge outlet which is originally designed to discharge only the light liquid. As a result of this, it is possible to prevent a situation in which the light liquid and the heavy liquid having processed are discharged from the light liquid discharge outlet by being mingled with each other. Also, in this liquid-liquid contact device, even when the light liquid introduced into the inner chamber overflows from the lower opening of the inner chamber into the outer chamber, it is possible to prevent the light liquid from being discharged through the heavy liquid discharge outlet which is originally designed to discharge only the heavy liquid. As a result of this, it is possible to prevent a situation in which the heavy liquid and the light liquid having processed are discharged from the heavy liquid discharge outlet by being mingled with each other.

In the liquid-liquid contact device, the light liquid discharge outlet is preferably disposed above the upper opening.

In this configuration, the light liquid discharge outlet is disposed above the upper opening, so that, even when the heavy liquid overflows from the upper opening into the outer chamber, the heavy liquid can be prevented from being discharged through the light liquid discharge outlet with more certainty.

In the liquid-liquid contact device, the heavy liquid discharge outlet is preferably disposed below the lower opening.

In this configuration, the heavy liquid discharge outlet is disposed below the lower opening, so that, even when the light liquid overflows from the lower opening into the outer chamber, the light liquid can be prevented from being discharged through the heavy liquid discharge outlet with more certainty.

In the liquid-liquid contact device, the heavy liquid ejection orifice is preferably disposed in the inner chamber and below the upper opening.

According to this configuration, the heavy liquid ejected from the heavy liquid ejection orifice of the heavy liquid introduction tube can be introduced into the inner chamber with certainty.

In the liquid-liquid contact device, the light liquid ejection orifice is preferably disposed in the inner chamber and above the lower opening.

According to this configuration, the light liquid ejected from the light liquid ejection orifice of the light liquid introduction tube can be introduced into the inner chamber with certainty.

The liquid-liquid contact device preferably further includes a discharge flow rate controlling device which controls at least one of a discharge flow rate of the light liquid discharged from the outer chamber through the light liquid discharge outlet and a discharge flow rate of the heavy liquid discharged from the outer chamber through the heavy liquid discharge outlet so as to maintain a height position of a contact interface between the light liquid and the heavy liquid within a range of between the light liquid discharge outlet and the heavy liquid discharge outlet, the contact interface being formed in the outer chamber.

With this configuration, at least one of the discharge flow rate of the light liquid discharged from the outer chamber through the light liquid discharge outlet and the discharge flow rate of the heavy liquid discharged from the outer chamber through the heavy liquid discharge outlet is controlled by the discharge flow rate controlling device, whereby the height position of the contact interface between the light liquid and the heavy liquid in the outer chamber is maintained within a range of between the light liquid discharge outlet and the heavy liquid discharge outlet. For this reason, the contact interface can be prevented from rising to reach the light liquid discharge outlet when the introduction flow rate of the heavy liquid into the inner chamber increases, and also the contact interface can be prevented from lowering to reach the heavy liquid discharge outlet when the introduction flow rate of the light liquid into the inner chamber increases. Therefore, it is possible to prevent a situation in which the heavy liquid is discharged from the outer chamber through the light liquid discharge outlet or the light liquid is discharged from the outer chamber through the heavy liquid discharge outlet in accordance with a fluctuation in the introduction flow rates of the heavy liquid and the light liquid into the inner chamber.

The liquid-liquid contact device preferably further includes an introduction flow rate controlling device which controls at least one of an introduction flow rate of the light liquid introduced into the inner chamber through the light liquid introduction tube and an introduction flow rate of the heavy liquid introduced into the inner chamber through the heavy liquid introduction tube so as to maintain a height position of a contact interface between the light liquid and the heavy liquid within a range of between the light liquid discharge outlet and the heavy liquid discharge outlet, the contact interface being formed in the outer chamber.

With this configuration, at least one of the introduction flow rate of the light liquid introduced into the inner chamber through the light liquid introduction tube and the introduction flow rate of the heavy liquid introduced into the inner chamber through the heavy liquid introduction tube is controlled by the introduction flow rate controlling device, whereby the height position of the contact interface between the light liquid and the heavy liquid in the outer chamber is maintained within a range of between the light liquid discharge outlet and the heavy liquid discharge outlet. For this reason, the introduction flow rate of the light liquid into the inner chamber can be prevented from increasing to such an extent that the contact interface lowers to reach the heavy liquid discharge outlet, and also the introduction flow rate of the heavy liquid into the inner chamber can be prevented from increasing to such an extent that the contact interface rises to reach the light liquid discharge outlet. Therefore, according to this configuration, it is possible to prevent a fluctuation in the introduction flow rates of the light liquid and the heavy liquid into the inner chamber such that the heavy liquid is discharged from the outer chamber through the light liquid discharge outlet or the light liquid is discharged from the outer chamber through the heavy liquid discharge outlet.

A liquid-liquid contact method according to the embodiments and modifications described above is a liquid-liquid contact method which provides countercurrent contact between a light liquid and a heavy liquid which has a larger specific gravity than the light liquid, the liquid-liquid contact method including a preparation step of preparing the liquid-liquid contact device; an introduction step of introducing the light liquid into the inner chamber through the light liquid introduction tube and introducing the heavy liquid into the inner chamber through the heavy liquid introduction tube; a contact step of providing countercurrent contact between the light liquid and the heavy liquid by allowing the light liquid introduced into the inner chamber to ascend and allowing the heavy liquid introduced into the inner chamber to descend; a discharge step performed after the contact step, the discharge step allowing the light liquid to flow out from the inner chamber to the outer chamber through the upper opening so as to be discharged from the outer chamber through the light liquid discharge outlet, and allowing the heavy liquid to flow out from the inner chamber to the outer chamber through the lower opening so as to be discharged from the outer chamber through the heavy liquid discharge outlet; and a discharge flow rate controlling step of controlling at least one of a discharge flow rate of the light liquid discharged from the outer chamber through the light liquid discharge outlet and a discharge flow rate of the heavy liquid discharged from the outer chamber through the heavy liquid discharge outlet so as to maintain a height position of a contact interface between the light liquid and the heavy liquid within a range of between the light liquid discharge outlet and the heavy liquid discharge outlet, the contact interface being formed in the outer chamber.

This liquid-liquid contact method controls at least one of the discharge flow rate of the light liquid discharged from the outer chamber through the light liquid discharge outlet and the discharge flow rate of the heavy liquid discharged from the outer chamber through the heavy liquid discharge outlet, whereby the height position of the contact interface between the light liquid and the heavy liquid in the outer chamber is maintained within a range of between the light liquid discharge outlet and the heavy liquid discharge outlet.

For this reason, the contact interface can be prevented from rising to reach the light liquid discharge outlet when the introduction flow rate of the heavy liquid into the inner chamber increases, and also the contact interface can be prevented from lowering to reach the heavy liquid discharge outlet when the introduction flow rate of the light liquid into the inner chamber increases. Therefore, it is possible to prevent a situation in which the heavy liquid is discharged from the outer chamber through the light liquid discharge outlet or the light liquid is discharged from the outer chamber through the heavy liquid discharge outlet in accordance with a fluctuation in the introduction flow rates of the heavy liquid and the light liquid into the inner chamber.

Also, a liquid-liquid contact method according to the embodiments and modifications described above is a liquid-liquid contact method which provides countercurrent contact between a light liquid and a heavy liquid which has a larger specific gravity than the light liquid, the liquid-liquid contact method including a preparation step of preparing the liquid-liquid contact device; an introduction step of introducing the light liquid into the inner chamber through the light liquid introduction tube and introducing the heavy liquid into the inner chamber through the heavy liquid introduction tube; a contact step of providing countercurrent contact between the light liquid and the heavy liquid by allowing the light liquid introduced into the inner chamber to ascend and allowing the heavy liquid introduced into the inner chamber to descend; a discharge step performed after the contact step, the discharge step allowing the light liquid to flow out from the inner chamber to the outer chamber through the upper opening so as to be discharged from the outer chamber through the light liquid discharge outlet, and allowing the heavy liquid to flow out from the inner chamber to the outer chamber through the lower opening so as to be discharged from the outer chamber through the heavy liquid discharge outlet; and an introduction flow rate controlling step of controlling at least one of an introduction flow rate of the light liquid introduced into the inner chamber through the light liquid introduction tube and an introduction flow rate of the heavy liquid introduced into the inner chamber through the heavy liquid introduction tube so as to maintain a height position of a contact interface between the light liquid and the heavy liquid within a range of between the light liquid discharge outlet and the heavy liquid discharge outlet, the contact interface being formed in the outer chamber.

This liquid-liquid contact method controls at least one of the introduction flow rate of the light liquid introduced into the inner chamber through the light liquid introduction tube and the introduction flow rate of the heavy liquid introduced into the inner chamber through the heavy liquid introduction tube, whereby the height position of the contact interface between the light liquid and the heavy liquid in the outer chamber is maintained within a range of between the light liquid discharge outlet and the heavy liquid discharge outlet. For this reason, the introduction flow rate of the light liquid into the inner chamber can be prevented from increasing to such an extent that the contact interface lowers to reach the heavy liquid discharge outlet, and also the introduction flow rate of the heavy liquid into the inner chamber can be prevented from increasing to such an extent that the contact interface rises to reach the light liquid discharge outlet. Therefore, this liquid-liquid contact method makes it possible to prevent a fluctuation in the introduction flow rates of the light liquid and the heavy liquid into the inner chamber such that the heavy liquid is discharged from the outer chamber through the light liquid discharge outlet or the light liquid is discharged from the outer chamber through the heavy liquid discharge outlet.

As described above, according to the aforementioned embodiments and modifications, even when the heavy liquid introduced into the inner chamber overflows from the upper opening, it is possible to prevent a situation in which the light liquid and the heavy liquid having processed are discharged from the liquid-liquid contact device by being mingled with each other.

The invention claimed is:

1. A liquid-liquid contact device which provides countercurrent contact between a light liquid and a heavy liquid which has a larger specific gravity than the light liquid, the liquid-liquid contact device comprising:
   an internal casing extending in a vertical direction and surrounding an inner chamber for providing countercurrent contact between the light liquid ascending from below and the heavy liquid descending from above;
   an external casing surrounding the internal casing so as to form an outer chamber around the internal casing;
   a light liquid introduction tube guiding the light liquid from an outside of the external casing to the inner chamber; and
   a heavy liquid introduction tube guiding the heavy liquid from an outside of the external casing to the inner chamber, wherein
   the light liquid introduction tube has a light liquid ejection orifice disposed in the inner chamber, the light liquid ejection orifice allowing the light liquid guided by the light liquid introduction tube to be ejected into the inner chamber through the light liquid ejection orifice;
   the heavy liquid introduction tube has a heavy liquid ejection orifice disposed in the inner chamber and above the light liquid ejection orifice, the heavy liquid ejection orifice allowing the heavy liquid guided by the heavy liquid introduction tube to be ejected into the inner chamber through the heavy liquid ejection orifice;
   the internal casing has an upper opening and a lower opening which opens at a location below the upper opening, the upper opening allowing the light liquid having made the countercurrent contact with the heavy liquid to flow out from the inner chamber to the outer chamber through the upper opening, the lower opening allowing the heavy liquid having made the countercurrent contact with the light liquid to flow out from the inner chamber to the outer chamber through the lower opening;
   the external casing has a heavy liquid discharge outlet and a light liquid discharge outlet which is disposed above the heavy liquid discharge outlet, the heavy liquid discharge outlet allowing the heavy liquid to be discharged from the outer chamber through the heavy liquid discharge outlet, the light liquid discharge outlet allowing the light liquid to be discharged from the outer chamber through the light liquid discharge outlet,
   the liquid-liquid contact device further comprises a filler that fills the inside of the inner chamber, the heavy liquid ejection orifice being disposed at a position that is above a region filled with the filler and below the upper opening, and the light liquid ejection orifice being disposed at a position that is below the region filled with the filler and above the lower opening.

2. The liquid-liquid contact device according to claim 1, wherein the light liquid discharge outlet is disposed above the upper opening.

3. The liquid-liquid contact device according to claim 1, wherein the heavy liquid discharge outlet is disposed below the lower opening.

4. The liquid-liquid contact device according to claim 1, further comprising a discharge flow rate controlling device which controls at least one of a discharge flow rate of the light liquid discharged from the outer chamber through the light liquid discharge outlet and a discharge flow rate of the heavy liquid discharged from the outer chamber through the heavy liquid discharge outlet so as to maintain a height position of a contact interface between the light liquid and the heavy liquid within a range between the upper opening and the lower opening of the internal casing, the contact interface being formed in the outer chamber.

5. The liquid-liquid contact device according to claim 1, further comprising an introduction flow rate controlling device which controls at least one of an introduction flow rate of the light liquid introduced into the inner chamber through the light liquid introduction tube and an introduction flow rate of the heavy liquid introduced into the inner chamber through the heavy liquid introduction tube so as to maintain a height position of a contact interface between the light liquid and the heavy liquid within a range between the upper opening and the lower opening of the internal casing, the contact interface being formed in the outer chamber.

6. A liquid-liquid contact method which provides countercurrent contact between a light liquid and a heavy liquid which has a larger specific gravity than the light liquid, the liquid-liquid contact method comprising:
   a preparation step of preparing the liquid-liquid contact device according to claim 1;
   an introduction step of introducing the light liquid into the inner chamber through the light liquid introduction tube and introducing the heavy liquid into the inner chamber through the heavy liquid introduction tube;
   a contact step of providing countercurrent contact between the light liquid and the heavy liquid by allowing the light liquid introduced into the inner chamber to ascend and allowing the heavy liquid introduced into the inner chamber to descend;
   a discharge step performed after the contact step, the discharge step allowing the light liquid to flow out from the inner chamber to the outer chamber through the upper opening so as to be discharged from the outer chamber through the light liquid discharge outlet, and allowing the heavy liquid to flow out from the inner chamber to the outer chamber through the lower opening so as to be discharged from the outer chamber through the heavy liquid discharge outlet; and
   a discharge flow rate controlling step of controlling at least one of a discharge flow rate of the light liquid discharged from the outer chamber through the light liquid discharge outlet and a discharge flow rate of the heavy liquid discharged from the outer chamber through the heavy liquid discharge outlet so as to maintain a height position of a contact interface between the light liquid and the heavy liquid within a range between the upper opening and the lower opening of the internal casing, the contact interface being formed in the outer chamber.

7. A liquid-liquid contact method which provides countercurrent contact between a light liquid and a heavy liquid which has a larger specific gravity than the light liquid, the liquid-liquid contact method comprising:
   a preparation step of preparing the liquid-liquid contact device according to claim 1;
   an introduction step of introducing the light liquid into the inner chamber through the light liquid introduction tube and introducing the heavy liquid into the inner chamber through the heavy liquid introduction tube;
   a contact step of providing countercurrent contact between the light liquid and the heavy liquid by allowing the light liquid introduced into the inner chamber to ascend and allowing the heavy liquid introduced into the inner chamber to descend;
   a discharge step performed after the contact step, the discharge step allowing the light liquid to flow out from the inner chamber to the outer chamber through the upper opening so as to be discharged from the outer chamber through the light liquid discharge outlet, and allowing the heavy liquid to flow out from the inner chamber to the outer chamber through the lower opening so as to be discharged from the outer chamber through the heavy liquid discharge outlet; and
   an introduction flow rate controlling step of controlling at least one of an introduction flow rate of the light liquid introduced into the inner chamber through the light liquid introduction tube and an introduction flow rate of the heavy liquid introduced into the inner chamber through the heavy liquid introduction tube so as to maintain a height position of a contact interface between the light liquid and the heavy liquid within a range between the upper opening and the lower opening of the internal casing, the contact interface being formed in the outer chamber.

8. The liquid-liquid contact device according to claim 1, further comprising a perforated plate that is a plate body in which numerous through-holes are formed,
   wherein the filler is disposed above the perforated plate, and
   the light liquid is ejected from the light liquid ejection orifice at a position below the perforated plate in the inner chamber and ascends in the inner chamber by passing through numerous holes formed in the perforated plate.

* * * * *